US006985630B2

(12) United States Patent
Kajiwara

(10) Patent No.: US 6,985,630 B2
(45) Date of Patent: Jan. 10, 2006

(54) IMAGE PROCESSING APPARATUS AND METHOD, PROGRAM AND STORAGE MEDIUM

(75) Inventor: Hiroshi Kajiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 682 days.

(21) Appl. No.: 09/962,109

(22) Filed: Sep. 26, 2001

(65) Prior Publication Data

US 2002/0061140 A1    May 23, 2002

(30) Foreign Application Priority Data

Sep. 27, 2000 (JP) .............................. 2000-295013
Sep. 17, 2001 (JP) .............................. 2001-282107

(51) Int. Cl.
*G06K 9/36* (2006.01)
*G06K 9/46* (2006.01)

(52) U.S. Cl. ................. 382/233; 382/166; 382/248; 375/240.19

(58) Field of Classification Search ................ 382/166, 382/233, 240, 247, 248, 294, 298, 162; 358/438; 375/240.19; 709/247
See application file for complete search history.

(56) References Cited

U.S. PATENT DOCUMENTS

| | | | | |
|---|---|---|---|---|
| 4,873,577 A | * | 10/1989 | Chamzas .................... | 382/240 |
| 5,467,142 A | * | 11/1995 | Ichinokawa ................ | 348/556 |
| 5,684,604 A | * | 11/1997 | Nakajima et al. .......... | 358/434 |
| 5,805,933 A | * | 9/1998 | Takahashi ................... | 710/72 |
| 5,945,930 A | | 8/1999 | Kajiwara ..................... | 341/50 |
| 6,028,963 A | | 2/2000 | Kajiwara ..................... | 382/239 |
| 6,031,938 A | | 2/2000 | Kajiwara ..................... | 382/239 |
| 6,101,282 A | | 8/2000 | Hirabayashi et al. ....... | 382/246 |
| 6,198,509 B1 | * | 3/2001 | Dougherty et al. ......... | 348/467 |
| 6,233,355 B1 | | 5/2001 | Kajiwara ..................... | 382/238 |
| 6,310,980 B1 | | 10/2001 | Kajiwara ..................... | 382/238 |
| 6,414,722 B1 | * | 7/2002 | Bramley ...................... | 348/565 |
| 6,480,238 B1 | * | 11/2002 | Knox et al. ................. | 348/569 |
| 6,507,674 B1 | * | 1/2003 | Yagishita et al. ........... | 382/239 |

FOREIGN PATENT DOCUMENTS

JP          11103445 A    *   4/1999

OTHER PUBLICATIONS

English translation of JP 11-103445A.*
Bhaskaran et al. (Image and Video Compression Standards—Algorithms and Architectures, 2nd ed., 1997, pp. 166-175).*
Tsekeridou et al. ("Embedding Self-Similar Watermark in the Wavelet Domain," IEEE International Conference on Acoustics, Speech and Signal Processing, vol. 6, Jun. 5-9, 2000, pp. 1967-1970).*

* cited by examiner

*Primary Examiner*—Bhavesh M. Mehta
*Assistant Examiner*—Yubin Hung
(74) *Attorney, Agent, or Firm*—Fitzpatrick, Cella, Harper & Scinto

(57) ABSTRACT

To provide an image processing apparatus and method, a program, and a storage medium which enables, in the case where encoded data is generated by encoding image data including mixed multi-level data and bi-level image data and the encoded data is then decoded, to read bi-level image data from the decoded image in spite of its low resolution. The multi-level image data and bi-level image data are separated and hierarchical encoding is performed on the multi-level image data so as to be decoded with multiple resolutions. Multiple pieces of bi-level data to be superimposed on the decoded image of multiple resolutions are prepared and encoded. The encoded bi-level image data is selected for decoding according to the resolution of the decoded image in the decoding process, and superimposed on the decoded multi-level image.

23 Claims, 26 Drawing Sheets

FIG. 23

| RESOLUTION LEVEL | CHARACTER STRING | DISPLAY POSITION | FONT SIZE |
|---|---|---|---|
| 0 | RABBIT | (16, 48) | 9 |
| 1 | RABBIT | (8, 16) | 9 |
| 1 | HEAD | (100, 20) | 9 |
| 1 | BACK | (50, 40) | 9 |
| 1 | LEG | (30, 80) | 9 |
| 2 | RABBIT | (30, 33) | 12 |
| 2 | EAR | (135, 45) | 10 |
| 2 | BACK | (120, 110) | 10 |
| 2 | LEG | (90, 150) | 10 |
| 2 | BREAST | (140, 140) | 10 |

IMAGE PROCESSING APPARATUS AND METHOD, PROGRAM AND STORAGE MEDIUM

FIELD OF THE INVENTION

The present invention relates to an image processing apparatus for decoding encoded image data and a method therefor, a program, and a storage medium.

BACKGROUND OF THE INVENTION

In recent years, with improvement of technology in image input devices such as digital cameras and scanners, resolutions of image data input via these input devices are continuously increasing. With image data of low resolution, which has small amount of image data, there has been no trouble in working such as transmitting, storing, displaying and editing. However, as the resolution increases, the amount of image data becomes enormous and causes the problems that it takes a long time to transmit the data or that a large memory capacity is required for storing the data. As a method for transmitting and displaying image data efficiently, progressive transmission of image data is drawing attention. This method transmits low quality image data in an early phase of image data transmission so that the image may be roughly grasped, and the image quality is increased with proceeding of data transmission. JPEG (Joint Photographic Experts Group), an international standard of encoding method for still images according to ITU-T Recommendation T. 81 and ISO/IEC 10918-1 prescribes progressive transmission in its expanding method.

When transmitting image data phase-by-phase according to the conventional progressive transmission method, if the image data to be transmitted is a natural image, the receiving side can roughly grasp the image based on a decoded image of low image quality obtained in an early phase of transmission. However, if the to-be-transmitted image is a document image including characters or lines, it is often difficult to obtain information from the characters or lines included in the image though an general configuration of the image can be comprehended based on the decoded image of low image quality.

For example, if image data in which multi-level image data and bi-level image data are mixed, such as map information, is transmitted phase-by-phase, it is difficult to read bi-level information from the decoded image of low quality in many cases.

The present invention is made in view of the above-described problems and its object is to make it possible, in the case where encoded data is generated by encoding image data including mixed multi-level image data and bi-level image data and the encoded data is then decoded, to read bi-level image data from the decoded image in spite of its low resolution.

SUMMARY OF THE INVENTION

To attain the object of the present invention, for example, an image processing apparatus according to the present invention which decodes an encoded data string including encoded image data and encoded additional information data obtained by encoding additional information prepared in accordance with the image size of reconstructed image from the encoded image data has:

an image data decoding means capable of selectively decoding multiple pieces of image data of different sizes from the encoded image data included in the encoded data string;

an additional information data decoding means for decoding additional information data corresponding to the image data decoded by the image data decoding means from the encoded additional information data included in the encoded data string; and a composition means for combining the image data obtained by the image data decoding means and the additional information data corresponding to the image data.

To attain the object of the present invention, for example, another image processing apparatus according to the present invention has: an image data encoding means for encoding image data to generate encoded data capable of expressing multiple self-similar images of different sizes corresponding to the image data;

an additional information data encoding means for generating encoded data of additional information data related to each of the multiple self-similar images; and an encoded data string generation means for generating an encoded data string including the encoded data generated by the image data encoding means and the encoded data generated by the additional information data encoding means, and causing the encoded data string to include a header therein, the header describing information that specifies locations of the encoded data of the self-similar image and the encoded data of the additional information data in the encoded data string.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 23 is a view showing an example of the additional information provided by a user in the fourth embodiment according to the present invention;

DETAILED DESCRIPTION OF THE PREFERRED EMBODIMENTS

Preferred embodiments of the present invention will now be described in detail in accordance with the accompanying drawings.

[First Embodiment]

Figure 1:
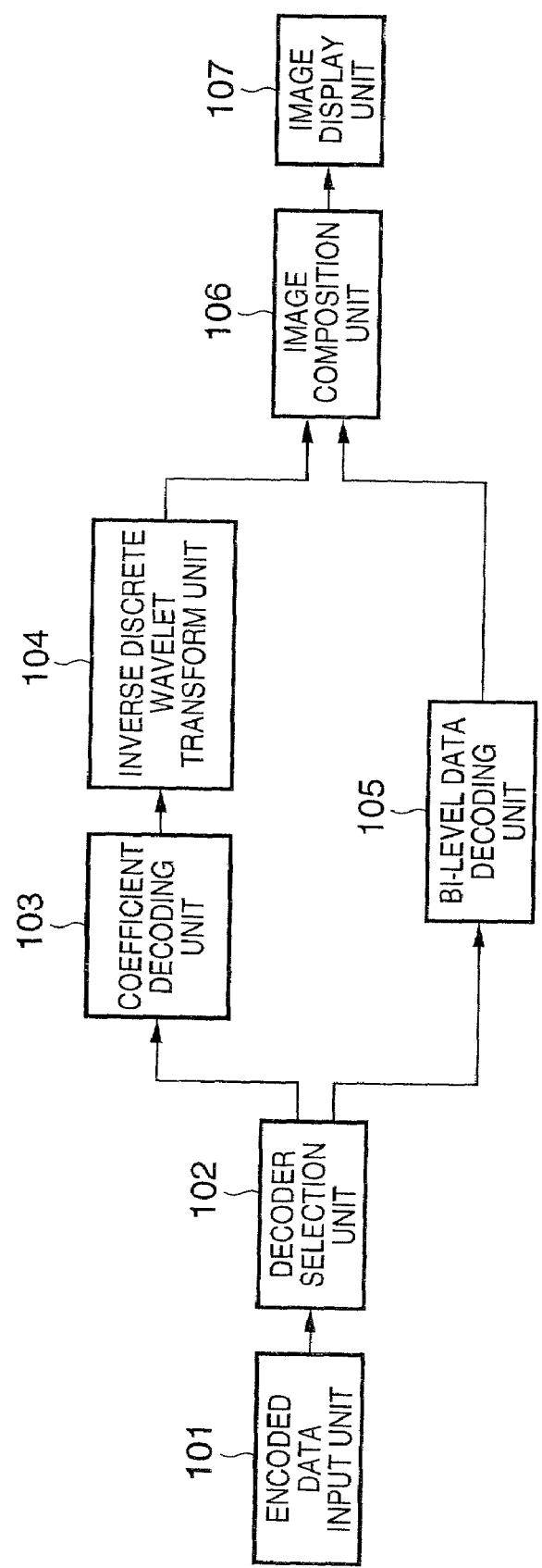
FIG. 1 is a block diagram showing a schematic configuration of an image decoding apparatus of a first embodiment according to the present invention.

FIG. 1 is a block diagram showing a schematic configuration of an image decoding apparatus in this embodiment. In the figure, reference numeral 101 denotes an encoded data input unit, 102 a decoder selection unit, 103 a coefficient decoding unit, 104 an inverse discrete wavelet transform unit, 105 a bi-level data decoding unit, 106 an image composition unit, and 107 an image display unit.

In this embodiment, the explanation will be made with an example that monochrome image data in which the luminance value of one pixel is represented by 8 bits is decoded and displayed. However, it is apparent from the following description that the embodiment is not limited to this example and it is applicable to the cases where luminance value is represented by other than 8 bits, for example, 4 bits, 10 bits or 12 bits as well as the cases of color image data in which each pixel is represented by multiple color components such as RGB, YCrCb and CMYK. It is also apparent from the following description that, if encoded data of multi-level information indicating a condition of each pixel in an image region is decoded and displayed, the embodiment is applicable to the case where the color of each pixel is represented by an index value for a color table, and the encoded data of the index value is decoded and displayed.

Before describing an operation of the image decoding apparatus of this embodiment, an image encoding apparatus, which makes a pair with the image decoding apparatus, will be explained.

Figure 2:
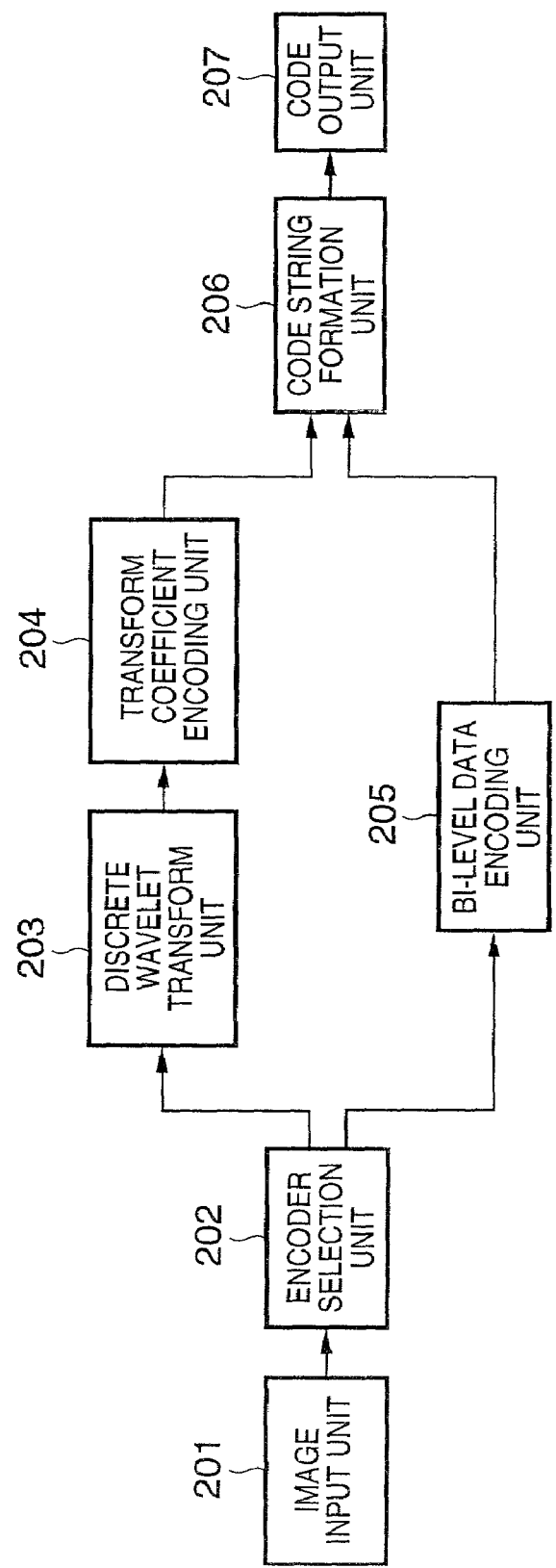
FIG. 2 is a block diagram showing a schematic configuration of an image encoding apparatus for generating encoded data to be input to the image decoding apparatus of the present invention having the configuration shown in FIG. 1.

FIG. 2 is a block diagram showing a schematic configuration of the image encoding apparatus for generating encoded data to be input to the image decoding apparatus of this embodiment having the configuration shown in FIG. 1. In FIG. 2, reference numeral 201 denotes an image data input unit, 202 an encoder selection unit, 203 a discrete wavelet transform unit, 204 a transform coefficient encoding unit, 205 a bi-level data encoding unit, 206 a code string formation unit and 207 a code output unit.

An operation of the image encoding apparatus having the configuration shown in FIG. 2 will be described as follows.

The image encoding apparatus generates a single code string for four images, namely, a piece of multi-level image data input by the image data input unit 201 and three pieces of bi-level image data which are different in sizes (bi-level image data A, B and C) and outputs it by the code output unit 207. Examples of the above-described four images input to the image data input unit 201 are shown in FIG. 3.

Figure 3:
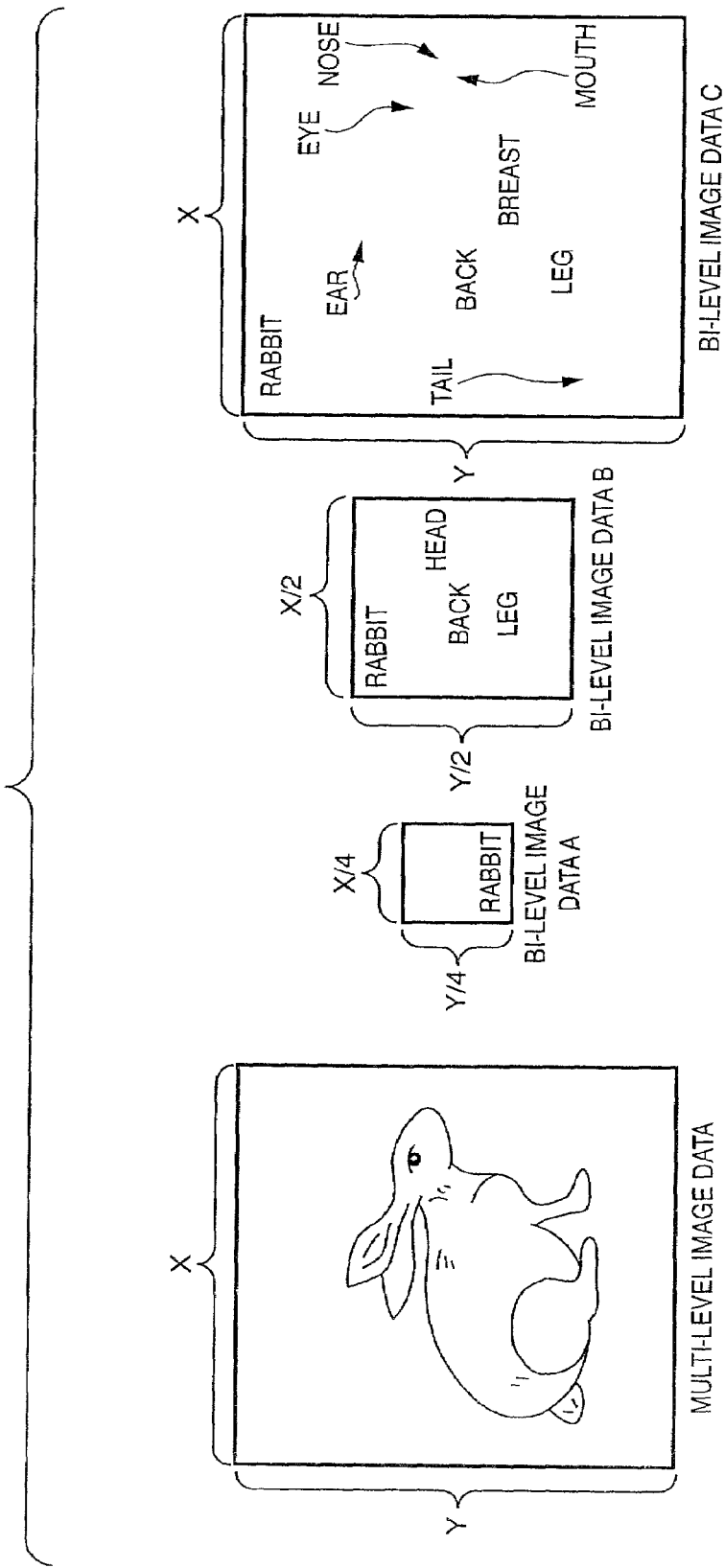
FIG. 3 shows four images to be input to an image data input unit 201.

In FIG. 3, the numbers of pixels in the horizontal and vertical directions of the multi-level image are supposed to be represented as (X, Y), and then the numbers of pixels in the horizontal and vertical directions of the bi-level image data A, B and C are (X/4, Y/4), (X/2, Y/2) and (X, Y), respectively. For simplifying the explanation, the numbers of pixels X and Y are supposed to be multiples of 4.

First of all, these pieces of input image data are input to the image data input unit 201 in the order of multi-level image data, bi-level image data A, bi-level image data B and bi-level image data C, in each of which pixel values constituting the image data are input in the order of raster scanning. The image data input unit 201 may be an image pickup apparatus such as a scanner or digital camera, an image pickup device such as a CCD, an interface of network lines, or the like.

The encoder selection unit 202 switches between encoding processes according to whether the image data input through the image data input unit 201 is the multi-level data or bi-level data. As a result of switching between the processes, the multi-level image data is transmitted to the discrete wavelet transform unit 203 and the bi-level image data A, B and C are transmitted to the bi-level data encoding unit 205. The multi-level data is encoded by the discrete wavelet transform unit 203 and transform coefficient encoding unit 204, and the bi-level data is encoded by the bi-level data encoding unit 205. Firstly, an encoding process of multi-level data will be described.

The discrete wavelet transform unit 203 performs a two-dimensional discrete wavelet transform on the multi-level image data input through the encoder selection unit 202, and the image data are decomposed into multiple sub-bands.

Figures 4A, 4B, 4C:
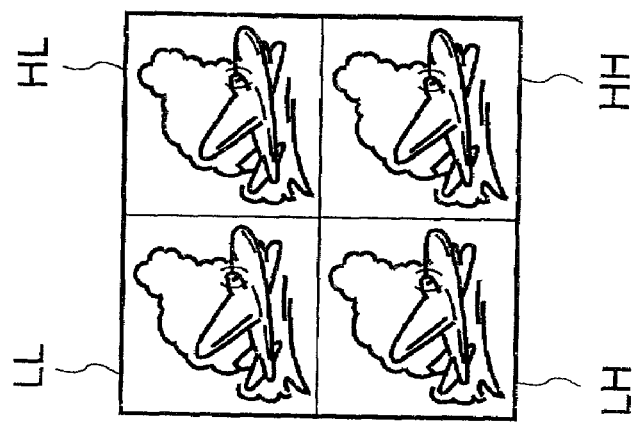
FIG. 4A illustrates a two-dimensional discrete wavelet transform.
FIG. 4B is another view illustrating the two-dimensional discrete wavelet transform.
FIG. 4C is another view illustrating the two-dimensional discrete wavelet transform.

The two-dimensional discrete wavelet transform is implemented by applying one-dimensional transform in each of the horizontal and vertical directions. At first, the one-dimensional discrete wavelet transform is applied to an image to be encoded (FIG. 4A) in the horizontal direction to decompose the image into a low frequency sub-band L and high frequency sub-band H (FIG. 4B). Furthermore, one-dimensional discrete wavelet transform in the vertical direction is applied to each of the sub-bands, thereby the image is decomposed into four sub-bands LL, HL, LH and HH (FIG. 4C). In the image encoding apparatus in this embodiment, one-dimensional discrete wavelet transform for N one-dimensional signal x (n), where $0 \leq n \leq N-1$, is supposed to be performed according to the following formulae:

$$h(n) = x(2n+1) - floor\{(x(2n) + x(2n+2))/2\}$$
$$l(n) = x(2n) + floor\{(h(n-1) + h(n) + 2)/4\}$$

where h (n) represents a coefficient of the high frequency sub-band, l (n) represents a coefficient of the low frequency sub-band, and floor $\{R\}$ represents a largest integer which does not exceed a real number R. Here, the explanation about values of the one-dimensional signal x (n) at both ends, n<0, n>N−1 which are required for calculation by the above formulae is omitted, but the values should be obtained based on the value of the one-dimensional signal x (n), where $0 \leq n < N$, by a known method.

Figure 5:
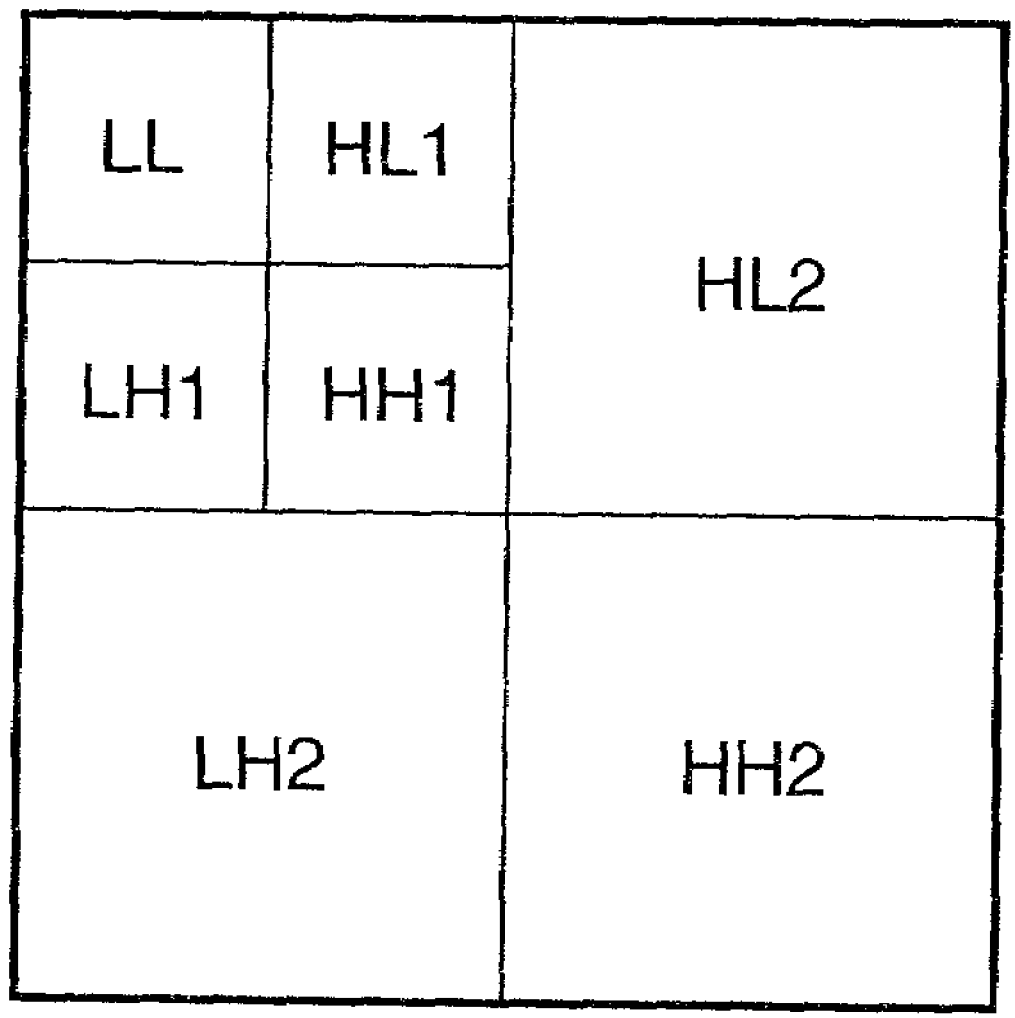
FIG. 5 shows seven sub-bands obtained by performing the two-dimensional discrete wavelet transform.

By applying the above-described two-dimensional discrete wavelet transform two more times only to the sub-band LL, the image is decomposed into seven sub-bands LL, LH1, HL1, HH1, LH2, HL2 and HH2 as shown in FIG. 5.

The transform coefficient encoding unit 204 encodes the transform coefficient of each sub-band generated by the discrete wavelet transform unit 203 to generate a code string. In this embodiment, encoding of the transform coefficient is performed per each sub-band, that is, performed by representing an absolute value of the coefficient value in the sub-band by a natural binary number, and transforming to a bi-level arithmetic encoding prior to a bit plane direction from the upper digit to the lower digit. The bit plane is constituted by the bits located in the same digit in representation of each coefficient value by the natural binary number.

Figure 6:
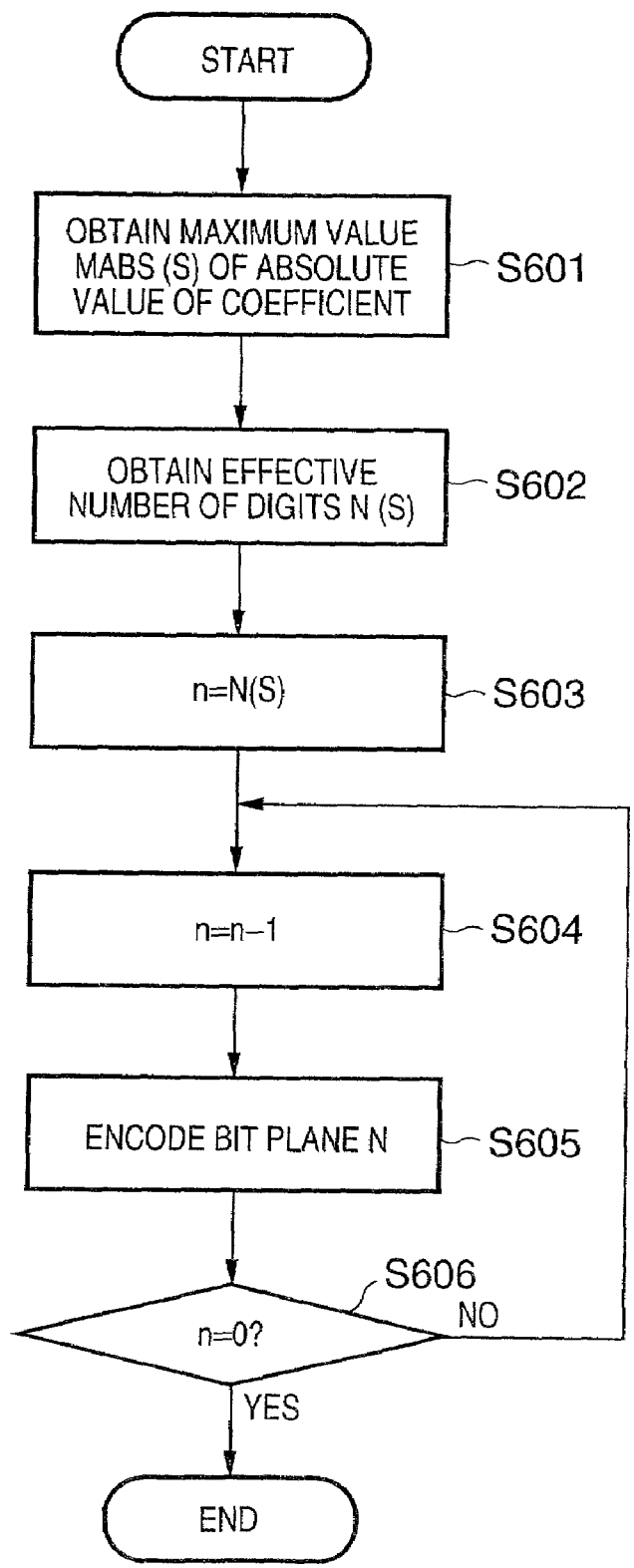
FIG. 6 is a flowchart showing a process of encoding a sub-band S in a transform coefficient encoding unit 204.
Figure 19:
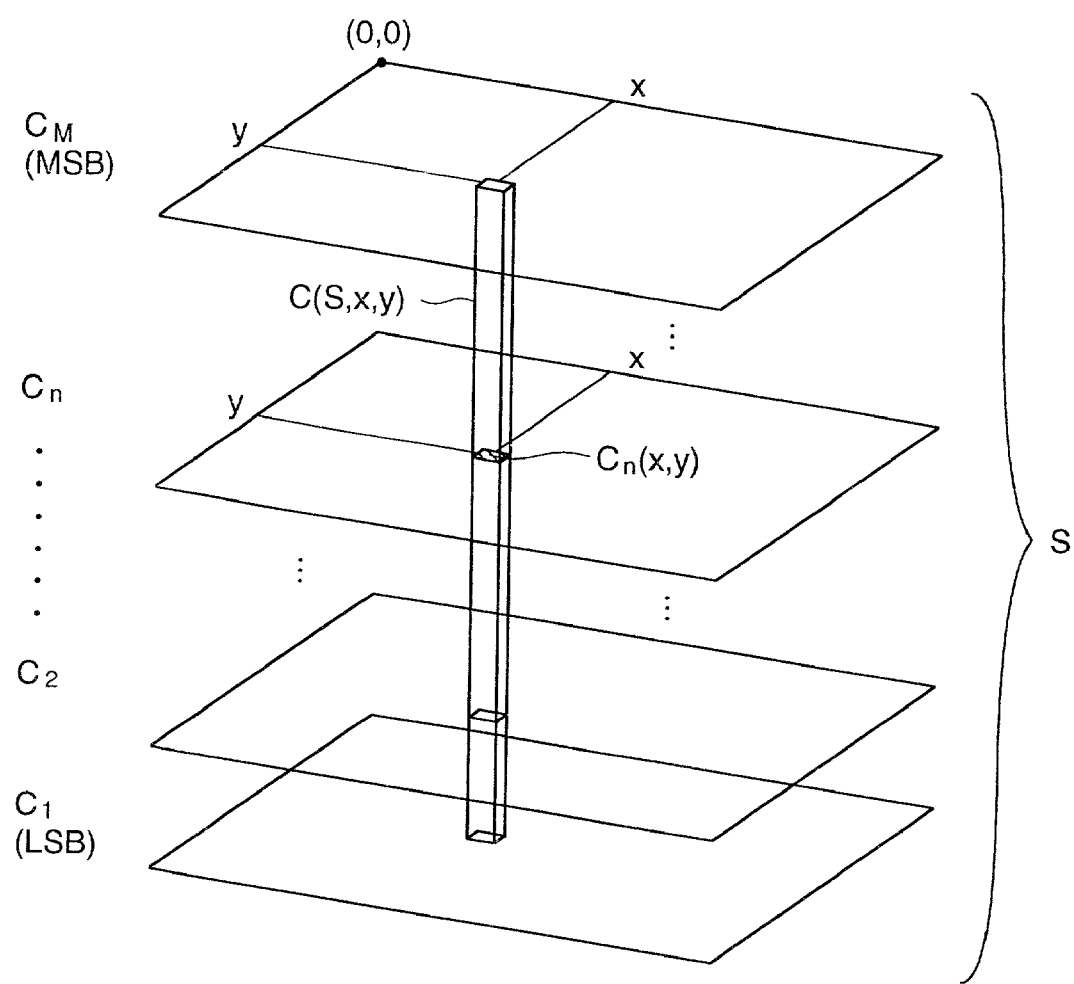
FIG. 19 is a view showing a coefficient included in a sub-band S and bits per each of bit planes constituting the coefficient.

In the following description, as shown in FIG. 19, the corner of top-left in each sub-band is supposed to be the position (0, 0), the coefficient of the sub-band S (S is any of LL, LH1, HL1, HH1, LH2, HL2 and HH2), existing in the position of the horizontal direction x and vertical direction y is notated as C (S, x, y), and a bit of the n-th lowest digit in natural binary notation of an absolute value thereof is notated as Cn (x, y). For a variable n representing a digit of the binary number, LSB is supposed to be the first digit. Hereinafter, the variable n representing the digit of the binary number is referred to as a bit plane number. FIG. 6 is a flowchart showing a process of encoding the sub-band S by the transform coefficient encoding unit 204. The program code according to the flowchart is supposed to be stored in a memory (not shown) such as ROM or RAM of the image encoding apparatus in this embodiment, and read and executed by a CPU (also not shown).

In the figure, a maximum value of an absolute value of the coefficient in the sub-band S, which is referred to as Mabs (S), is obtained (step S601), and using Mabs (S) thus obtained, the number of digits N (S), which corresponds to M in FIG. 19, required for representing Mabs (S) by a binary number is obtained according to the following formula (step S602):

$$N(S) = ceil\{log2(Mabs(S))\}$$

where ceil $\{R\}$ represents a smallest integer which is equal to or larger than a real number R. An effective number of digits N (S) is then substituted to the variable n (step S603). While decrementing the variable n by 1 (step S604), encoding is performed on n-th digit bit plane using the binary arithmetic encoding process (step S605).

In this embodiment, a QM-Coder is used as the binary arithmetic encoding. Procedures of encoding a bi-level symbol that occurs in a condition (context) S by using the QM-Coder or initialization procedures and termination procedures for the arithmetic encoding process are described in detail in the international standard of encoding method for still images according to ITU-T Recommendation T. 81, ISO/IEC 10918-1 and the like; therefore, explanation of these procedures will be omitted here.

As the above-described procedures of encoding process, suppose that when starting encoding of each bit plane, an arithmetic encoder (located in the transform coefficient encoding unit 204) is initialized, and when finishing, a process of terminating the arithmetic encoder is executed. Immediately after '1' firstly encoded in each coefficient, a plus or minus sign of the coefficient is represented by 0 or 1 and then subjected to arithmetic encoding. Suppose that the plus sign is represented by 0 and the minus sign is represented by 1. For example, if the coefficient is −5 and the effective number of digits N(S) of the sub-band S to which the coefficient belongs is 6, an absolute value of the coefficient is represented by a bi-level number 000101 and encoded from the upper digit to lower digit by encoding of each bit plane. When encoding the second bit plane (in this case, the fourth digit from the top), the first '1' is encoded, and immediately after, the plus or minus sign '1' is subjected to the arithmetic encoding.

Next, it is determined whether bit plane n encoded in step S605 is 0 or not (whether encoding has been performed on all the bit planes or not). If not all the bit planes have been subjected to encoding, the process proceeds to step S604 to perform encoding on a bit plane to be next processed.

According to the above-described process, all coefficients of the sub-band S are encoded to generate a code string CS (S, n) corresponding to each bit plane n. The code string having been generated is transmitted to the code string formation unit 206 and temporally stored in a buffer (not shown in the figure) in the code string formation unit 206.

Encoding of the bi-level data will be described next. Through the encoder selection unit 202, the bi-level data is transmitted to the bi-level data encoding unit 205 and subjected to the arithmetic encoding therein. In this embodiment, the QM-Coder is used for performing the arithmetic encoding in the bi-level data encoding unit 205 as in the case of bit plane encoding performed in the transform coefficient encoding unit 204. Suppose that, for the bi-level image data A, B and C, an arithmetic encoder (located in the bi-level data encoding unit 205) is initialized when starting encoding, and subjected to a termination process when finishing encoding.

According to the above process, the bi-level image data A, B and C are encoded to generate code strings CS (A), CS (B) and CS (C) each corresponding to each piece of bi-level image data. The code strings having been generated are transmitted to the code string formation unit 206 and temporally stored in a buffer (not shown in the figure) in the code string formation unit 206.

When encoding by the transform coefficient encoding unit 204 and bi-level data encoding unit 205 is completed and all the code strings are stored in the inside buffer, the code string formation unit 206 reads out the code strings from the inside buffer in a predetermined order, inserts necessary additional information in the strings to form final code strings to be an output of the image encoding apparatus of the present invention, and outputs them to the code output unit 207.

The final code strings generated in the code string formation unit 206 have three-level hierarchy, namely, level 0, level 1 and level 2.

The level 0 is constituted by code strings CS (LL, N (LL)−1) to CS (LL, 0) obtained by encoding the coefficient of sub-band LL of the multi-level image data and a code string CS (A) obtained by encoding the bi-level image data piece A.

The level 1 is constituted by code strings CS (LH1, N (LH1)−1) to CS (LH1, 0), CS (HL1, N (HL1)−1) to CS (HL1, 0) and CS (HH1, N (HH1)−1) to CS (HH1, 0) obtained by encoding the coefficients of the sub-bands LH1, HL1 and HH1 of the multi-level image data, respectively, and a code string CS (B) obtained by encoding the bi-level image data piece B.

The level 2 is constituted by code strings CS (LH2, N (LH2)−1) to CS (LH2, 0), CS (HL2, N (HL2)−1) to CS (HL2, 0) and CS (HH2, N (HH2)−1) to CS (HH2, 0) obtained by encoding the coefficients of the sub-bands LH2, HL2 and HH2 of the multi-level image data, respectively, and a code string CS (C) obtained by encoding the bi-level image data piece C.

Figure 7:
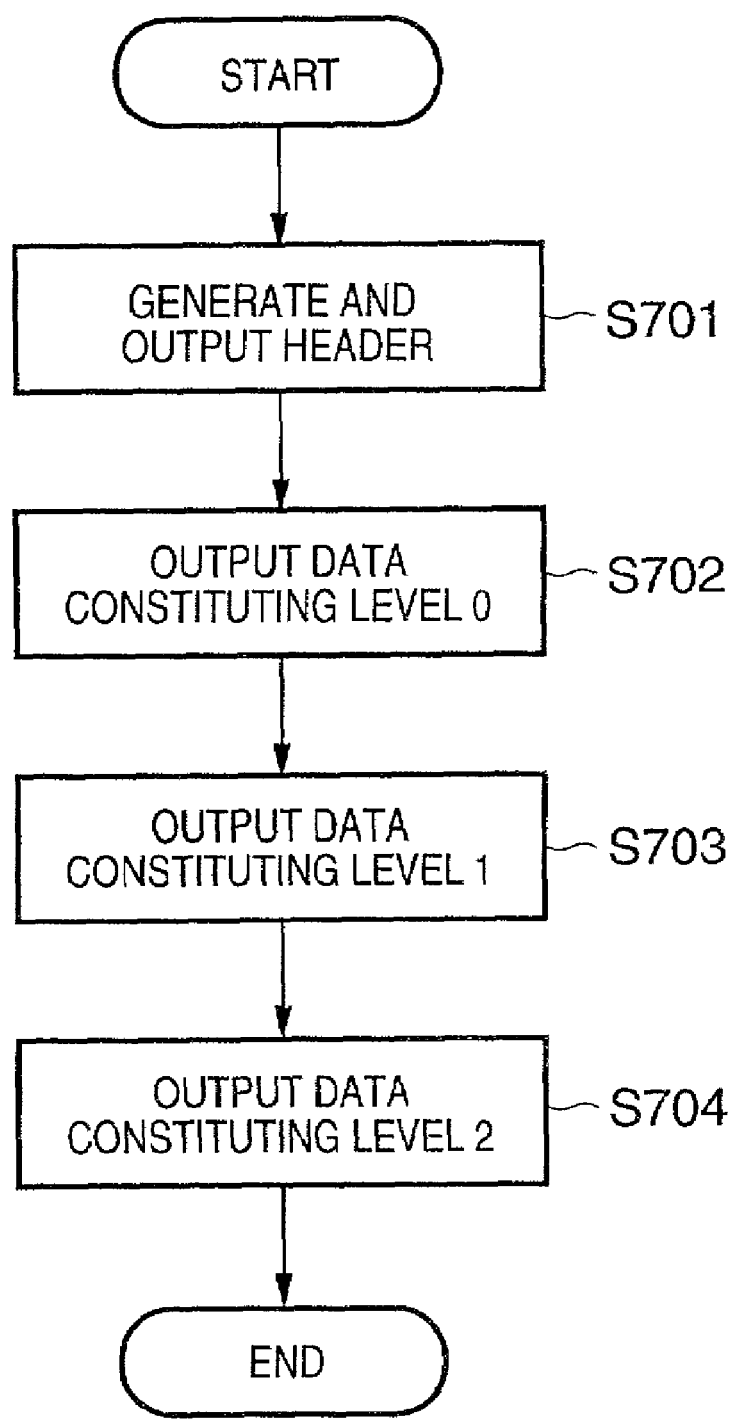
FIG. 7 is a flowchart showing a process in a code string formation unit 206.

FIG. 7 is a flowchart of the above-described process in the code string formation unit 206. The program code according to this flow chart is supposed to be stored in a memory such as a ROM, RAM and soon (not shown in the figure) in the image encoding apparatus in this embodiment, read by a CPU (not shown in the figure), and then executed. In the same manner, the program codes according to the flowcharts (FIGS. 8–10) showing the processes executed in steps S702, S703 and S704 in the flowchart in FIG. 7 are supposed to be stored in a memory not shown in the figure, read by a CPU not shown in the figure, and then executed.

First of all, a header containing additional information of an image such as the number of pixels in horizontal direction and vertical direction in the image is generated and output to the code output unit 207 (step S701).

Figure 8:
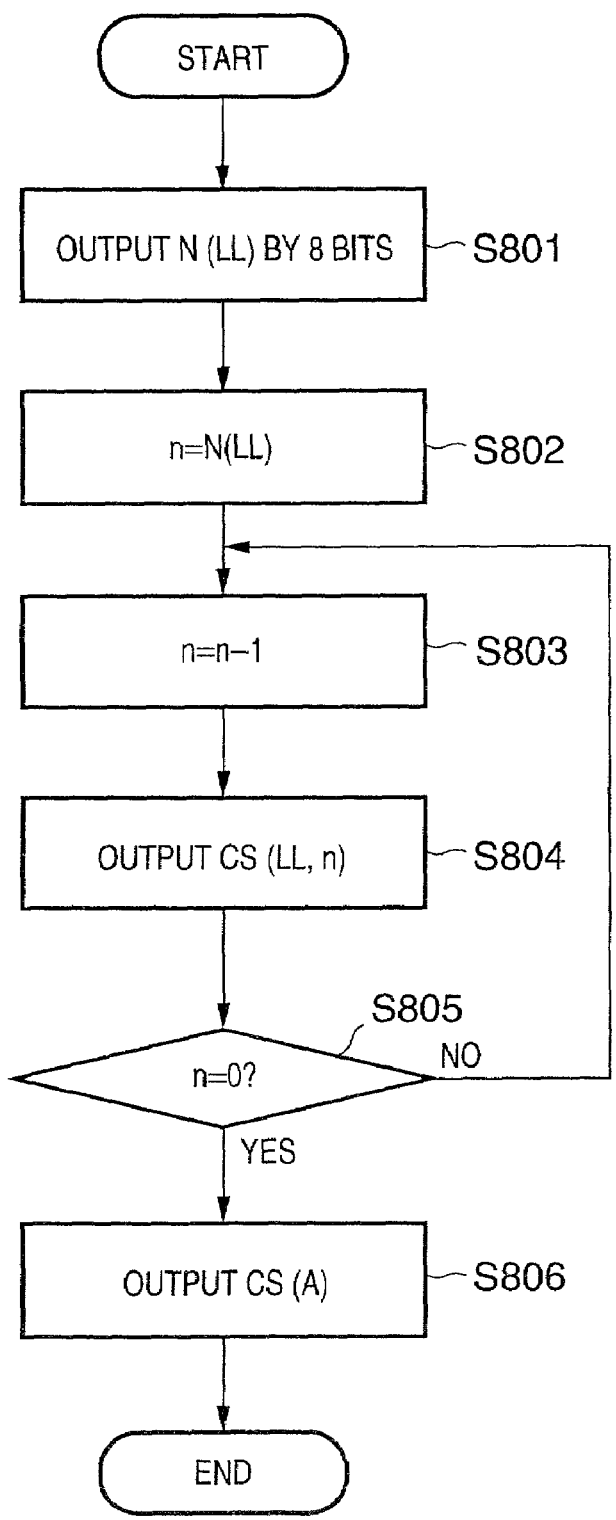
FIG. 8 is a flowchart showing a process of generating encoded data of sub-band LL and encoded data of bi-level image data A.

According to the process flow of the flowchart in FIG. 8, a code string obtained by encoding the coefficient of sub-band LL of the multi-level image data and a code string obtained by encoding the bi-level image data A, which constitute the level 0, is then output (step S702).

In the flowchart showing a process of generating encoded data of sub-band LL and encoded data of bi-level image data A shown in FIG. 8, the encoding process is performed on all the bit planes constituting the sub-band LL (steps S801 to 805) and then performed on the bi-level image data A (step S806) to obtain encoded data CS (LL, N (LL)−1) to CS (LL, 0) and CS (A), respectively, as described above.

Figure 9:
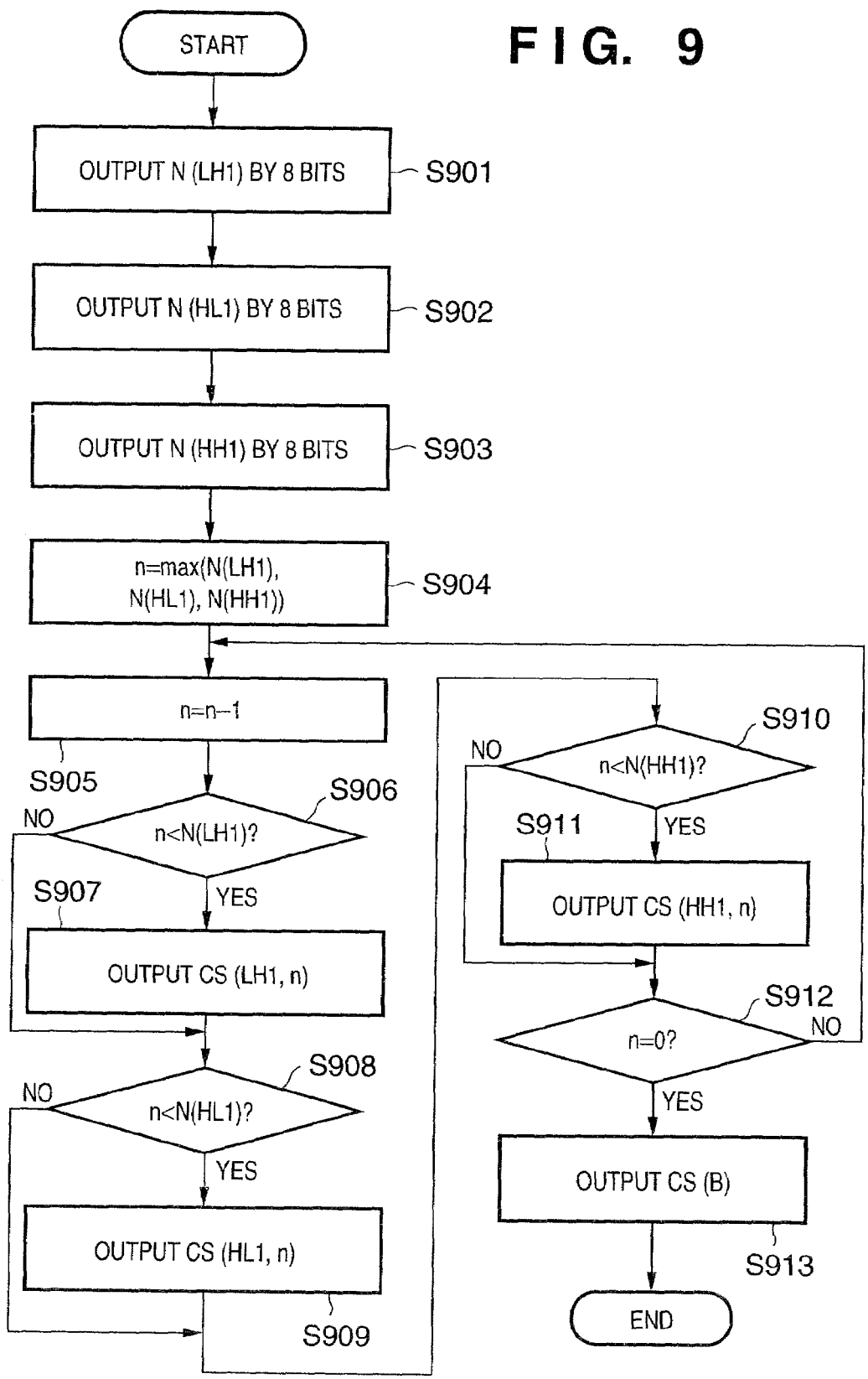
FIG. 9 is a flowchart showing a process of generating encoded data of sub-bands LH1, HL1 and HH1 and encoded data of bi-level image data B.

Returning to the explanation of FIG. 7, and according to a process flow shown in FIG. 9, the code strings obtained by encoding the coefficients of sub-bands LH1, HL1 and HH1 of multi-level image data and the code string obtained by encoding the bi-level image data B, which code strings constitute the level 1, are output (step S703).

In the flowchart showing a process of generating encoded data of sub-bands LH1, HL1 and HH1 and encoded data of bi-level image data B shown in FIG. 9, the encoding process is performed on the bit planes respectively constituting the sub-bands LH1, HL1 and HH1 (steps S901 and S906 to S907, S902 and S908 to S909, and S903 and S910 to 911) and then performed on the bi-level image data B (step S913) to obtain encoded data CS (LH1, N (LH1)−1) to CS (LH1, 0), CS (HL1, N (HL1)−1) to CS (HL1, 0), CS (HH1, N (HH1)−1) to CS (HH1, 0) and CS (B), respectively, as described above.

Figure 10:
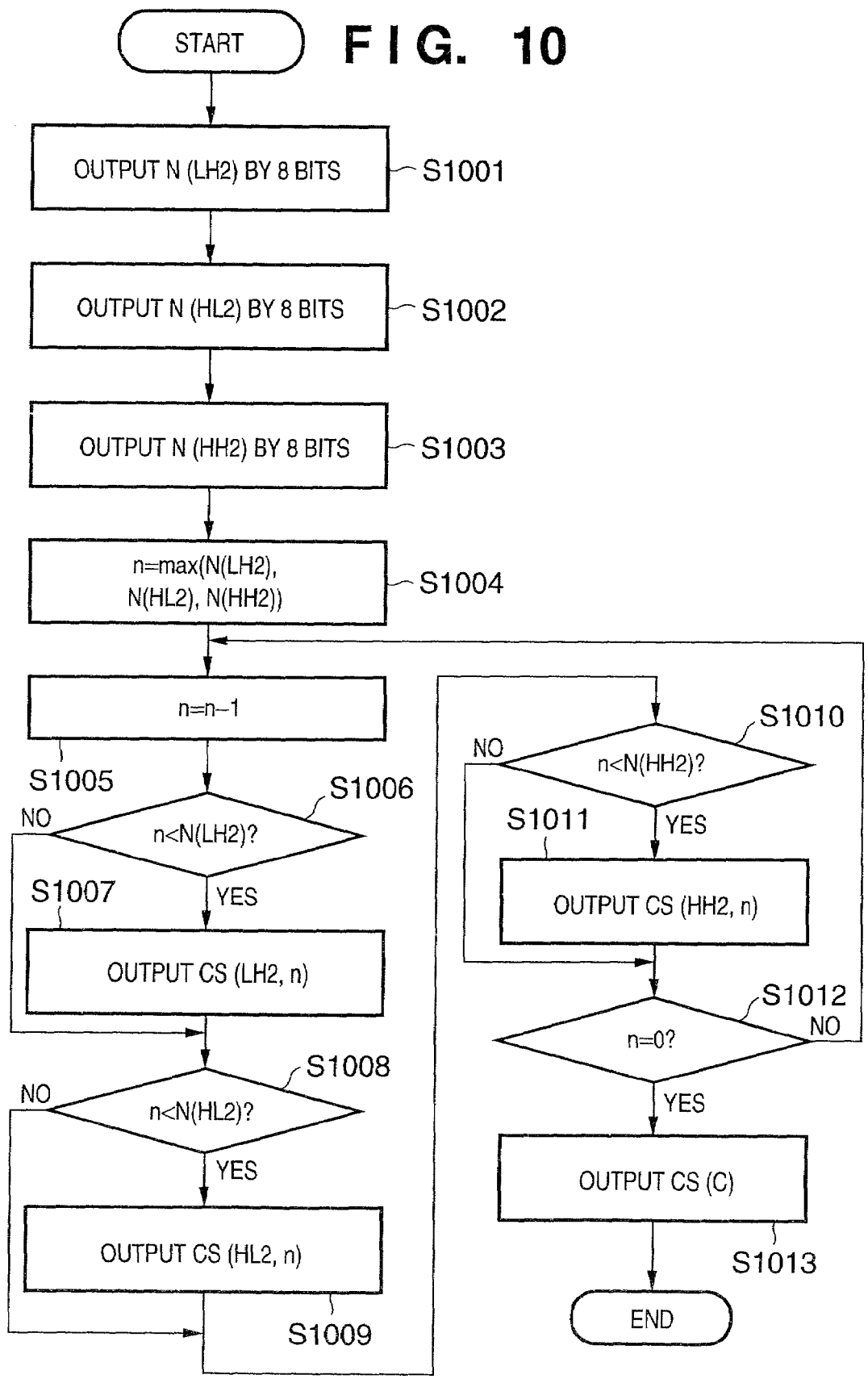
FIG. 10 is a flowchart showing a process of generating encoded data of sub-bands LH2, HL2 and HH2 and encoded data of bi-level image data C.

Returning to the explanation of FIG. 7 again, and according to a process flow shown in FIG. 10, the code strings obtained by encoding the coefficients of sub-bands LH2, HL2 and HH2 of multi-level image data and the code string obtained by encoding the bi-level image data C, which code strings constitute the level 2, are finally output (step S704).

In the flowchart showing a process of generating encoded data of sub-bands LH2, HL2 and HH2 and encoded data of bi-level image data C shown in FIG. 10, the encoding process is performed on the bit planes respectively constituting the sub-bands LH2, HL2 and HH2 (steps S1001 and S1006 to S1007, S1002 and S1008 to S1009, and S1003 and S1010 to 1011) and then performed on the bi-level image data C (step S1013) to obtain encoded data CS (LH2, N (LH2)−1) to CS (LH2, 0), CS (HL2, N (HL2)−1) to CS (HL2, 0), CS (HH2, N (HH2)−1) to CS (HH2, 0) and CS (C), respectively, as described above.

Figure 11:
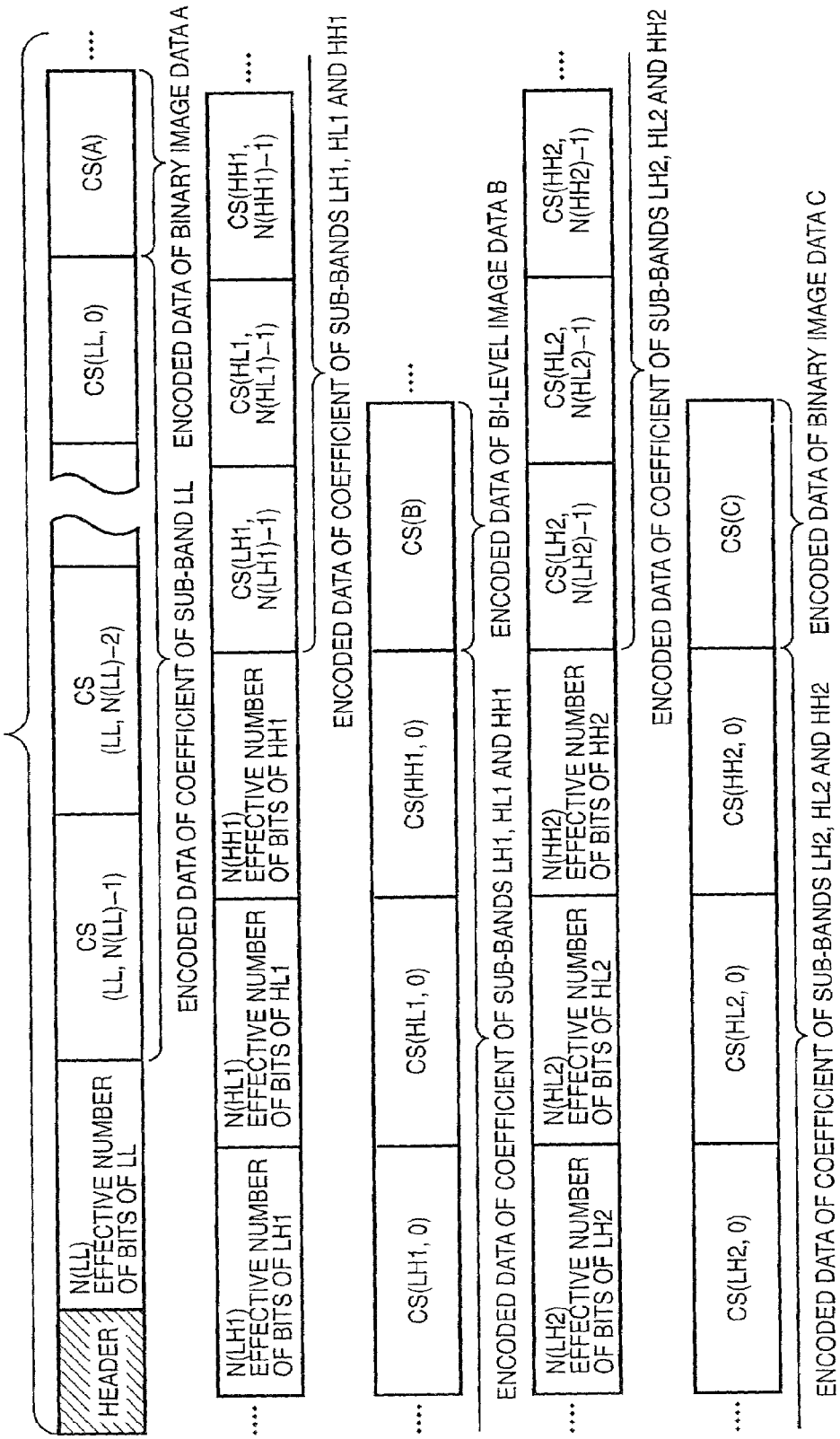
FIG. 11 is a view showing a format of a code string generated in the first embodiment according to the present invention.

According to the above-described processes, the code strings having formats exemplified in FIG. 11 are generated in the code string formation unit 206 and transmitted to the code output unit 207.

The code output unit 207 outputs the code strings generated in the code string formation unit 206 to the outside of the apparatus. The code output unit 207 is, for example, a storage device such as a hard disk or memory, an interface of network lines, or the like.

Next the image decoding apparatus of this embodiment, which receives an input of the code strings having the formats shown in FIG. 11 generated by the image encoding apparatus according to the above processes, decodes and displays an image will be described.

According to FIG. 1, first of all, the code strings having the formats shown in FIG. 11 are input through the encoded data input unit 101. The encoded data input unit 101 is, for example, a storage device such as a hard disk or memory, an interface of network lines, or the like.

The decoder selection unit 102 transmits the code strings input through the encoded data input unit 101 to the coefficient decoding unit 103 or bi-level data decoding unit 105 in accordance with their contents (by referring to the header). More specifically, the effective number of bits of each sub-band and encoded data of the coefficient of the sub-band are transmitted to the coefficient decoding unit 103, and the encoded data of the bi-level image data is transmitted to the bi-level data decoding unit 105. The header information including the number of pixels in the horizontal direction and vertical direction is interpreted in the decoder selection unit 102 and referred to in the entire image decoding apparatus.

The coefficient decoding unit 103 decodes the encoded data of the coefficient of the sub-band transmitted from the decoder selection unit 102 back into the transform coefficient. In the order of being transmitted to the coefficient decoding unit 103, pieces of the data CS (S, n) which is a result of arithmetic encoding performed on the bit plane n of the sub-band S are decoded from the upper bit plane to the lower bit plane, thus decoding the coefficient of the target sub-band S. As previously described, each bit plane of the transform coefficient is arithmetic-encoded by using the QM-Coder; therefore, in the same manner, the decoding process by the QM-Coder is executed here. Procedures of encoding a bi-level symbol that occurs in a condition (context) S by using the QM-Coder or initialization procedures and termination procedures for the decoding process of the arithmetic code are described in detail in the international standard of encoding method for still images according to ITU-T Recommendation T. 81, ISO/IEC 10918-1 and the like; therefore, explanation of these procedures will be omitted here.

In the above-described decoding process, suppose that when starting decoding of each bit plane, an arithmetic decoder (located in the coefficient decoding unit 103) is initialized, and when finishing, a process of terminating the arithmetic decoder is executed. As explained in the encoding process, not only the bits constituting the absolute values of the coefficients, but also the bits representing the plus or minus signs of the coefficients are encoded to generate the bit plane encoded data; and therefore, as in the case of encoding, the bits constituting the absolute values of the coefficients and the bits constituting the plus or minus signs of the coefficients are decoded.

The inverse discrete wavelet transform unit 104 stores the transform coefficient decoded in the coefficient decoding unit 103 in a buffer (not shown in the figure) inside of the inverse discrete wavelet transform unit 104, performs a two-dimensional inverse discrete wavelet transform on transform coefficients in the buffer at the points in time when all the coefficients of sub-band LL are stored, when all the coefficients of sub-bands LL, LH1, HL1 and HH1 are stored, and when all the transform coefficients are stored to generate a one-fourth reduced image, one-half reduced image and the equal-size decoded image and transmits them to the image composition unit 106. However, at the point in time when all the coefficients of the sub-band LL are stored, there exist the coefficients of low frequency sub-band; therefore, instead of performing the two-dimensional inverse discrete wavelet transform, the coefficients of the sub-band LL is transformed to 8-bit data and then output. The transform to 8-bit data is a process performed by replacing the coefficient of the sub-band LL, which is 0 or less, into 0 and replacing the coefficient of the sub-band LL, which is 255 or more, into 255.

The two-dimensional inverse discrete wavelet transform is implemented by applying one-dimensional transform in each of the horizontal and vertical directions. In the image decoding apparatus of this embodiment, the inverse transform of the coefficient l (n) of the low frequency sub-band and the coefficient h (n) of the high frequency sub-band, which are obtained by performing the discrete wavelet transform on N one-dimensional signal x (n), is supposed to be performed by the following formulae:

$$x(2n) = l(n) - floor\{(h(n-1) + h(n) + 2)/4\}$$

$$x(2n+1) = h(n) + floor\{(x(2n) + x(2n+2))/2\}$$

where floor {R} represents a largest integer which does not exceed a real number R. Here, the explanation about values of both ends of l (n) and h (n) which are required for calculation by the above formulae is omitted, but the values are supposed to be obtained by a known method.

The encoded data of the bi-level image data is decoded in the bi-level data decoding unit 105, and the decoded bi-level image data is transmitted to the image composition unit 106. As in the case of the coefficient decoding unit 103, the QM-Coder is also used here for performing the decoding process on the arithmetic code. Suppose that, for each of bi-level image data A, B and C, an arithmetic decoder (located in the bi-level data decoding unit 105) is initialized when starting decoding, and subjected to a termination process when finishing decoding.

The image composition unit 106 generates a composite image by superimposing the one-fourth reduced image output by the inverse discrete wavelet transform unit 104 and the bi-level image data A output by the bi-level image data decoding unit 105, and outputs the composite image to the image display unit 107. Similarly, the one-half reduced image and bi-level image data B, and the equal-sized decoded image and bi-level image data C are superimposed and output. Suppose that, if a pixel value at a position (x, y) of the multi-level image is represented as M (x, y) and a pixel value at the same position of the bi-level image is represented as B (x, y), where B (x, y) is supposed to be 0 in a background part of the bi-level image and 1 in a foreground part, a pixel value S (x, y) at the same position of the composite image is 0 provided that B (x, y)=1, and in other cases, that is, provided that B (x, y)=0, the pixel value S (x, y) is M (x, y).

The image display unit 107 causes a display screen to display the composite image generated in the image composition unit 106.

Figure 12:
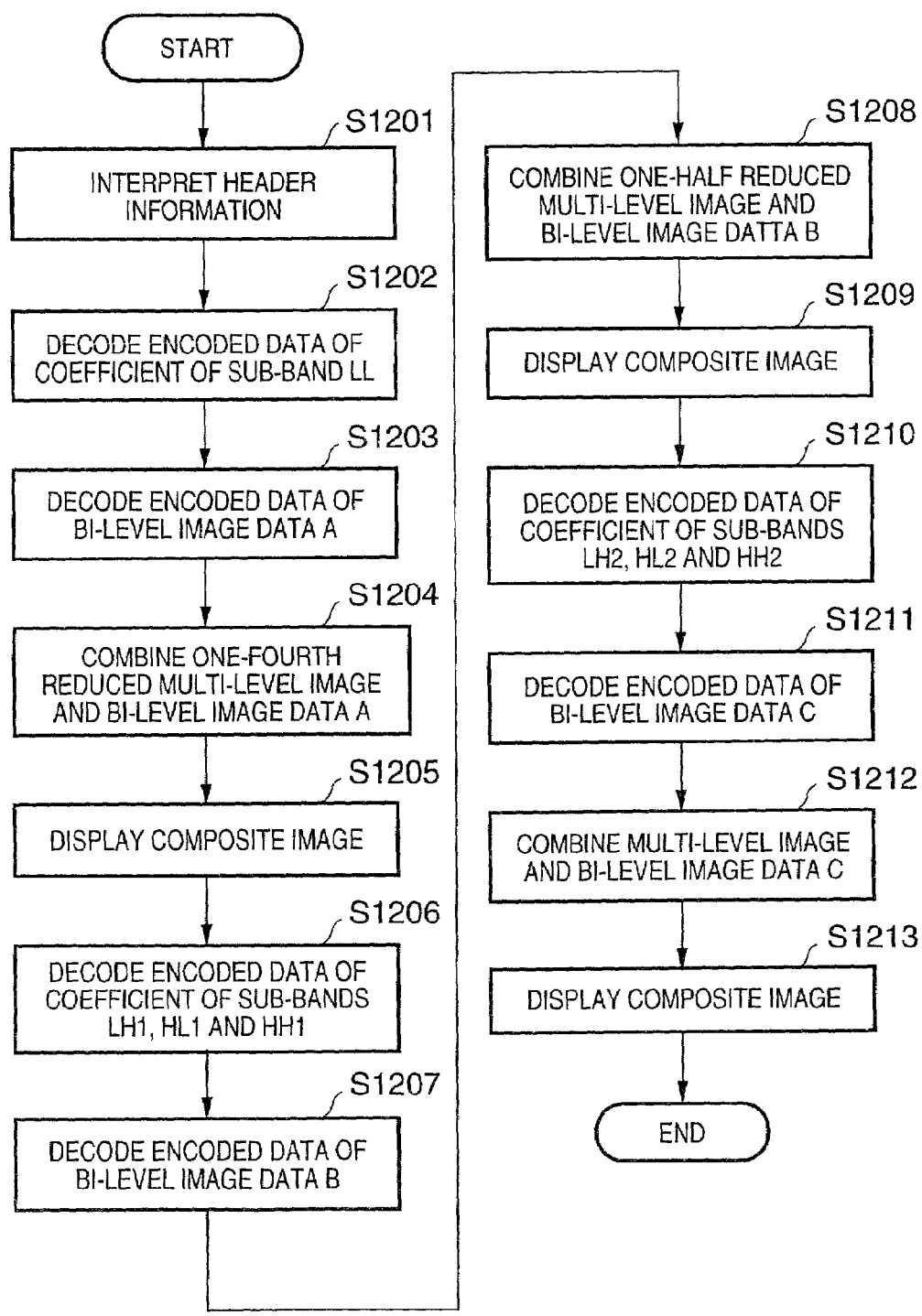
FIG. 12 is a flowchart showing a process of the image decoding apparatus of the first embodiment according to the present invention.

FIG. 12 is a flowchart showing a process of the image decoding apparatus of this embodiment. The program code according to the flowchart is supposed to be stored in a memory (not shown) such as ROM or RAM, and read and executed by a CPU (also not shown).

Figure 13:
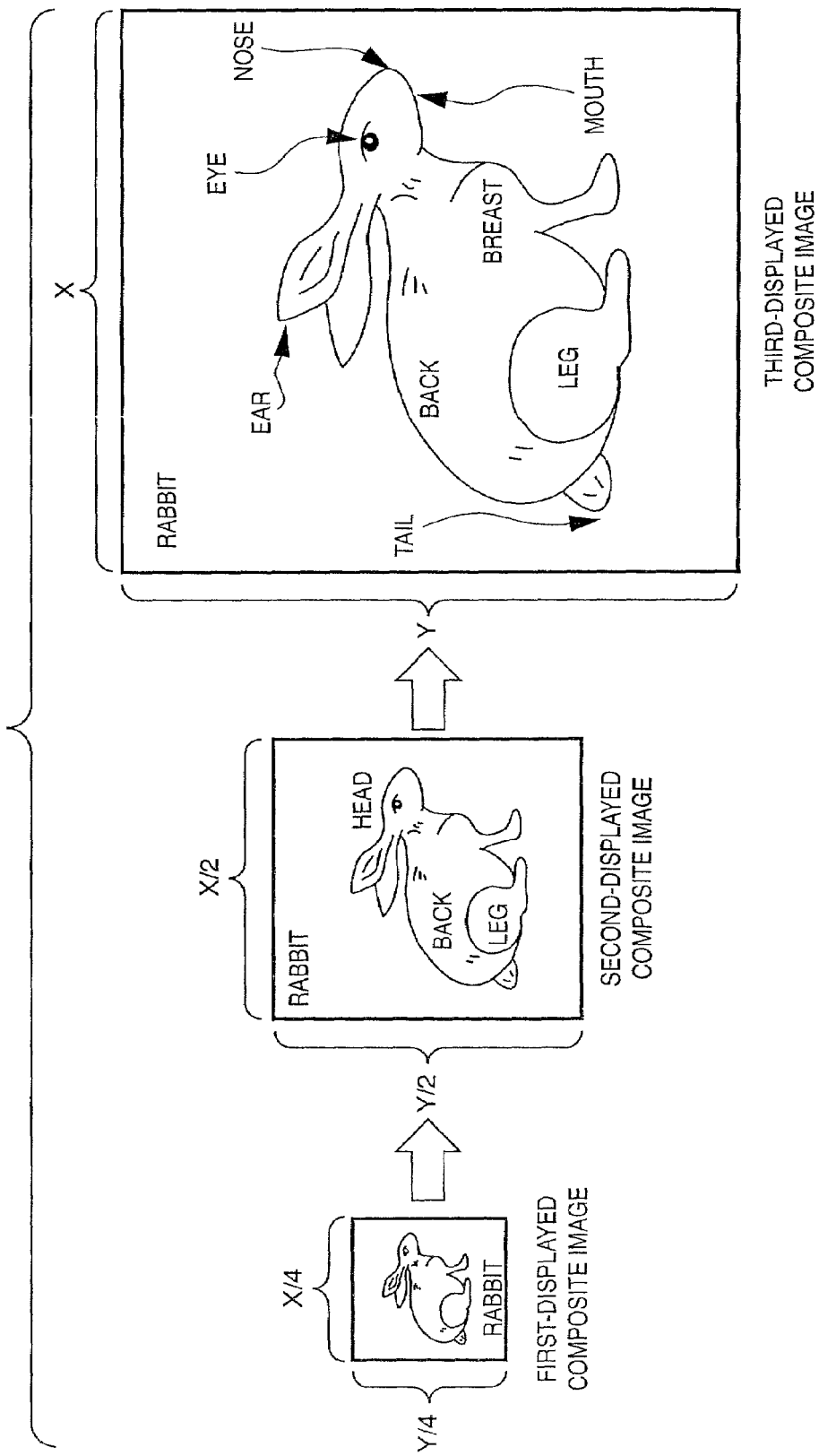
FIG. 13 is a view showing three composite images which are displayed when a code string, which is obtained by inputting the multi-level image data, bi-level image data A, bi-level image data B and bi-level image data C of FIG. 3 to the image encoding apparatus of the first embodiment of the present invention, is input to the image decoding apparatus of the first embodiment.

From the figure, it is understood that three composite images different in resolution level are displayed for an input of a single code string by steps S1205, S1209 and S1213. FIG. 13 shows three composite images which are displayed if a code string obtained by inputting the images shown in FIG. 3 as the multi-level image data and bi-level image data A, B and C to the image encoding apparatus previously described is input to the image decoding apparatus of this embodiment. As can be seen in the example of FIG. 13, it is possible to read the bi-level image data from the decoded image of low resolution by preparing bi-level image data corresponding to the decoded image of low resolution and generating the composite image.

[Second Embodiment]

Figure 14:
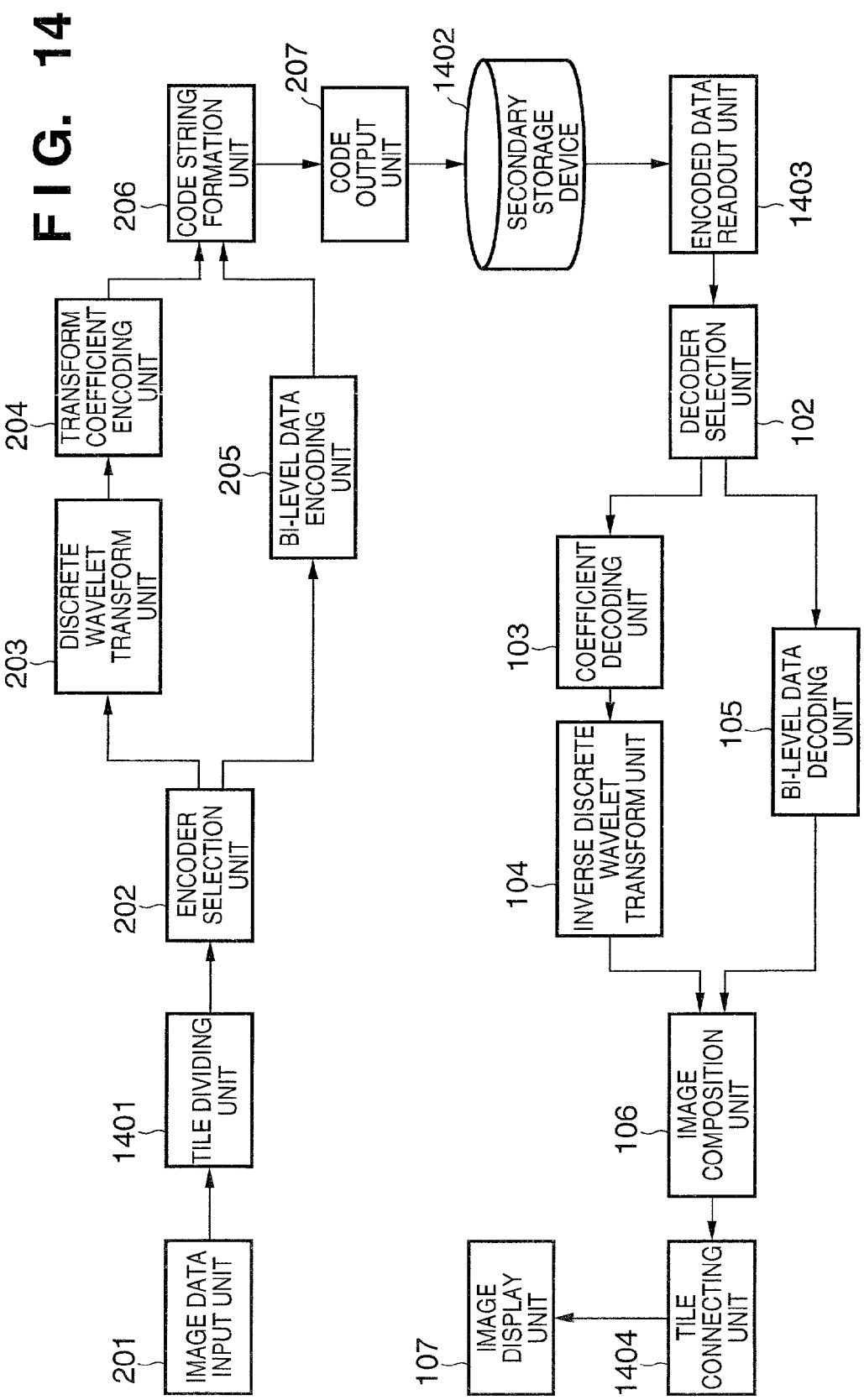
FIG. 14 is a block diagram showing a schematic configuration of a system of a second embodiment according to the present invention.

FIG. 14 is a block diagram showing a schematic configuration of a system for encoding and decoding images in the second embodiment. Items common to those in the block diagrams in FIGS. 1 and 2 showing schematic configurations of the image encoding apparatus and image decoding apparatus will be given the same reference numbers and not explained in further detail.

In FIG. 14, reference numeral 1401 denotes a tile dividing unit, 1402 a secondary storage device, 1403 an encoded data readout unit and 1404 a tile connecting unit. The encoded data readout unit 1403 can serve as the encoded data input unit 101.

In this embodiment, just as in the first embodiment described above, it is supposed that monochrome image data in which the luminance value of one pixel is represented by 8 bits is encoded and decoded. However, it is apparent from the following description that the embodiment is not limited to this example and it is applicable to the cases where luminance value is represented by other than 8 bits, for example, 4 bits, 10 bits or 12 bits as well as the cases of color image data in which each pixel is represented by multiple color components such as RGB, YCrCb and CMYK. It is also applicable to the case where the multi-level information indicating a condition of each pixel in an image region is encoded and decoded, for example, the case where the color of each pixel is represented by an index value for a color table, and the index value is encoded and decoded.

The operation of each unit in the system of this embodiment will be described as follows with reference to the block diagram shown in FIG. 14.

The system of this embodiment is constituted by three parts: an encoding processing part that encodes four images, namely, a piece of multi-level image data input through the image data input unit 201 and three pieces of bi-level image data different in size (referred to as bi-level image data A, B and C) and stores the encoded data in the secondary storage device 1402; a decoding processing part that reads the encoded data from the secondary storage device 1402, decodes the data and displays the decoded image; and the secondary storage device 1402.

The encoding processing part is constituted by the image data input unit 201, tile dividing unit 1401, encoder selection unit 202, discrete wavelet transform unit 203, transform coefficient encoding unit 204, bi-level data encoding unit 205, code string formation unit 206 and code output unit 207.

The decoding processing part is constituted by the encoded data readout unit 1403, decoder selection unit 102, coefficient decoding unit 103, inverse discrete wavelet transform unit 104, bi-level data decoding unit 105, image composition unit 106, tile connecting unit 1404 and image display unit 107.

The encoding processing part is identical with the image encoding apparatus described in the first embodiment except that the tile dividing unit 1401 is newly added to the image encoding apparatus and the secondary storage device 1402 receives the output from the code output unit 207.

Similarly, the decoding processing part is identical with the image decoding apparatus described in the first embodiment except that the tile connecting unit 1404 is newly added to the image decoding apparatus and the encoded data readout unit 1403 (corresponding to the encoded data input unit 101) reads the code strings from the secondary storage device 1402.

The operation of the encoding processing part will be described with reference to FIG. 14.

At first, as in the case of the above-described first embodiment, a piece of multi-level image data and three pieces of bi-level image data different in size (referred to as bi-level image data A, B and C), four images in total, are input through the image data input unit 201 in sequence.

Figure 15:
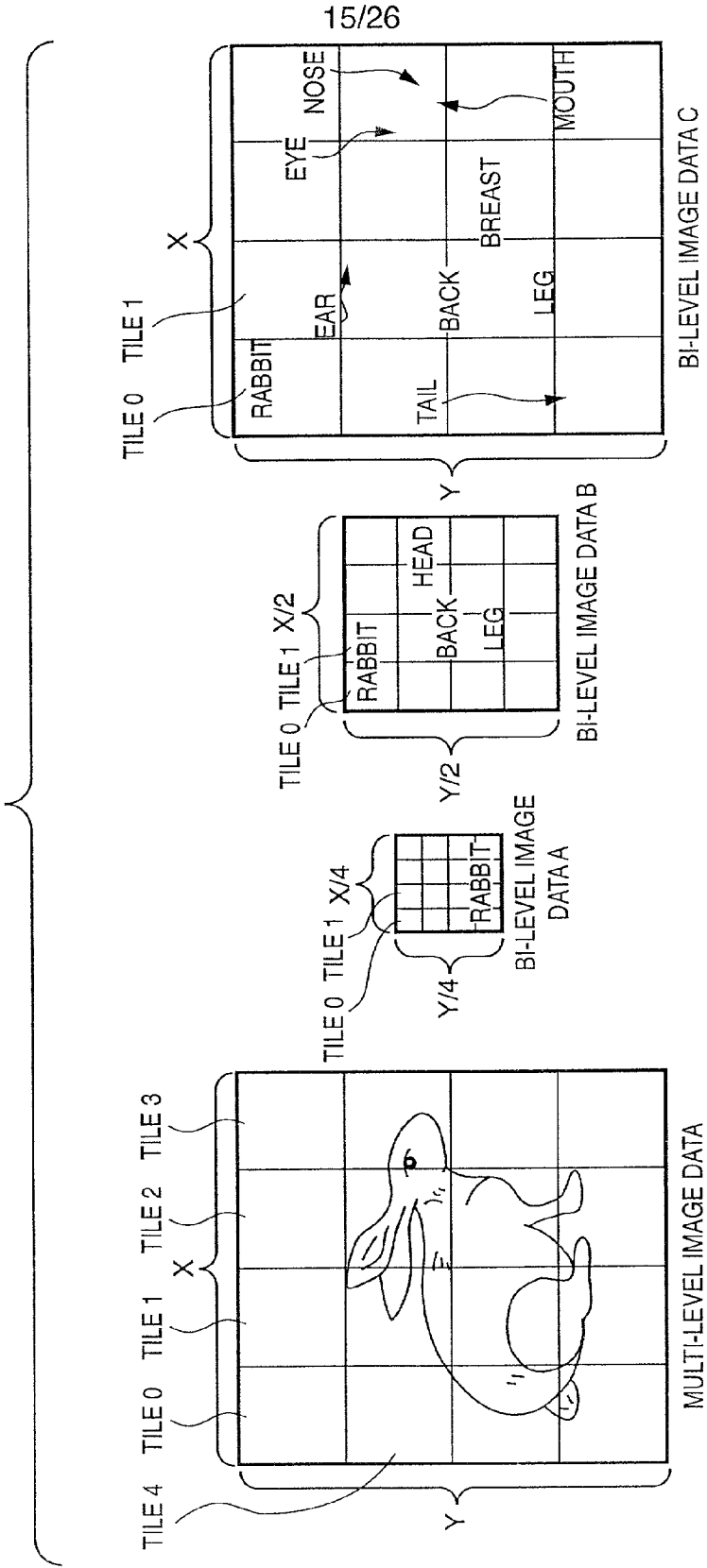
FIG. 15 shows each tile generated by a tile dividing unit 1401 in the second embodiment according to the present invention.
Figure 16:
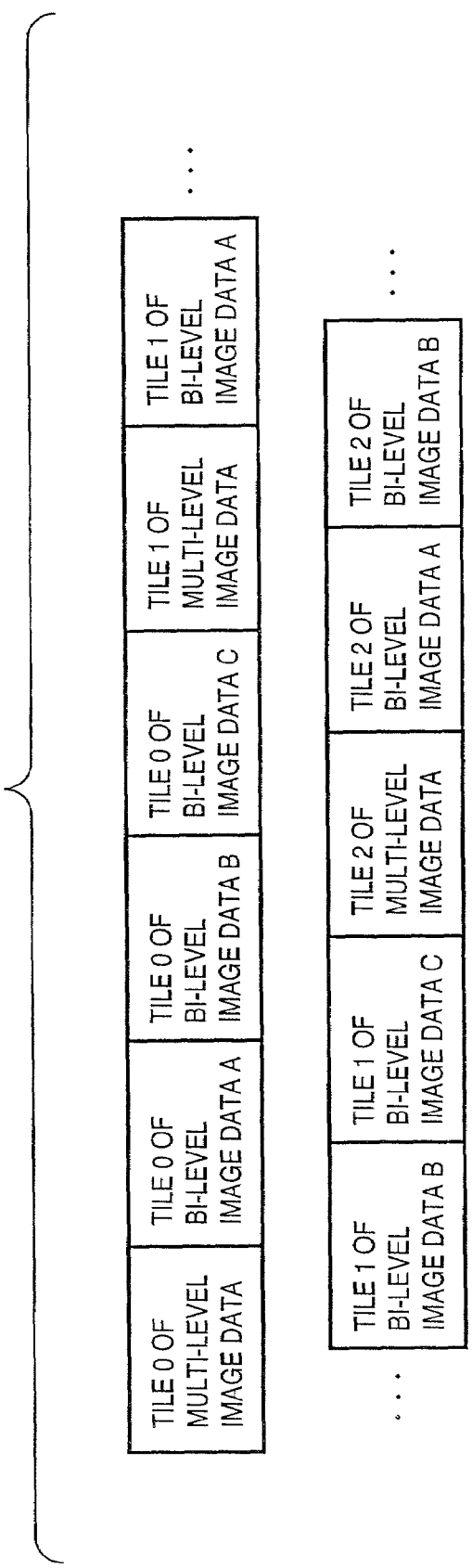
FIG. 16 is a view showing a configuration of image data (tile data) output from the tile dividing unit 1401.

The tile dividing unit 1401 temporally stores the four images to be encoded (a piece of multi-level image data and three pieces of bi-level image data) input through the image data input unit 201 in a buffer (not shown in the figure) in the tile dividing unit 1401. Upon storing the four images to be encoded, the tile dividing unit 1401 divides each image into sixteen tiles as shown in FIG. 15 and then extracts a tile of the same position in each of the multi-level image data and bi-level image data A, B and C, arranges the tiles from the four images for each tile position and outputs them. Numbers are assigned to the tiles from left to right and top to bottom, for example, a tile in the upper-left corner is referred to tile 0, a tile adjacent on the right thereto is tile 1, . . . , and so on. By identifying the rearranged tiles with the tile numbers thus assigned, the image data (tile data) is output from the tile dividing unit 1401 in the order as shown in FIG. 16.

The units from the encoder selection unit 202 to the code string formation unit 206 regard the tile n (n ranges from 0 to 15) of the multi-level image data and tiles n of the bi-level image data A, B and C output from the tile dividing unit 1401 as an input image, and performs the process as in the first embodiment to generate a code string for each tile. In this embodiment, the tile number is included in the header information and stored.

According to the process described above, sixteen code strings corresponding to the tiles having tile number 0 to 15 are generated for the four images and stored in the secondary storage device 1402.

The operation of the decoding processing part will be described next.

The system of this embodiment is capable of decoding and displaying the images with three levels so that the user may select a level. The three levels are referred to as a low image quality mode, middle image quality mode and high image quality mode. Though this function is provided to the decoding processing part of the system of this embodiment, it may be provided to the image decoding apparatus of the first embodiment.

The encoded data readout unit 1403 (corresponding to the encoded data input unit 101) varies the data to be read from the secondary storage device 1402 in accordance with the selected mode: in the case of low image quality mode, the data constituting the level 0 is read from each of tiles of the tile number 0 to 15 in this order and transmitted to the decoder selection unit 102; in the case of middle image quality mode, the data constituting the levels 0 and 1 is read from each of tiles of the tile number 0 to 15 in this order and transmitted to the decoder selection unit 102; and in the case of high image quality mode, the data constituting the levels 0 to 2 (namely, all the data) is read from each of tiles of the tile number 0 to 15 in this order and transmitted to the decoder selection unit 102.

The units from the decoder selection unit 102 to the image composition unit 106 decode the code strings output from the encoded data readout unit 1403 according to the process same as the above-described first embodiment, and generate a composite image.

The tile connecting unit 1404 rearranges the composite image output from the image composition unit 106 in original positions of tiles to generate an image to be displayed. The process of tile connecting and display image generation is performed every time the composite image is transmitted from the image composition unit 106. That is, the image display unit 107 can display the process in which the tiles are decoded one by one in the order of the number from tile 0 to tile 15.

[Third Embodiment]

Figure 17:
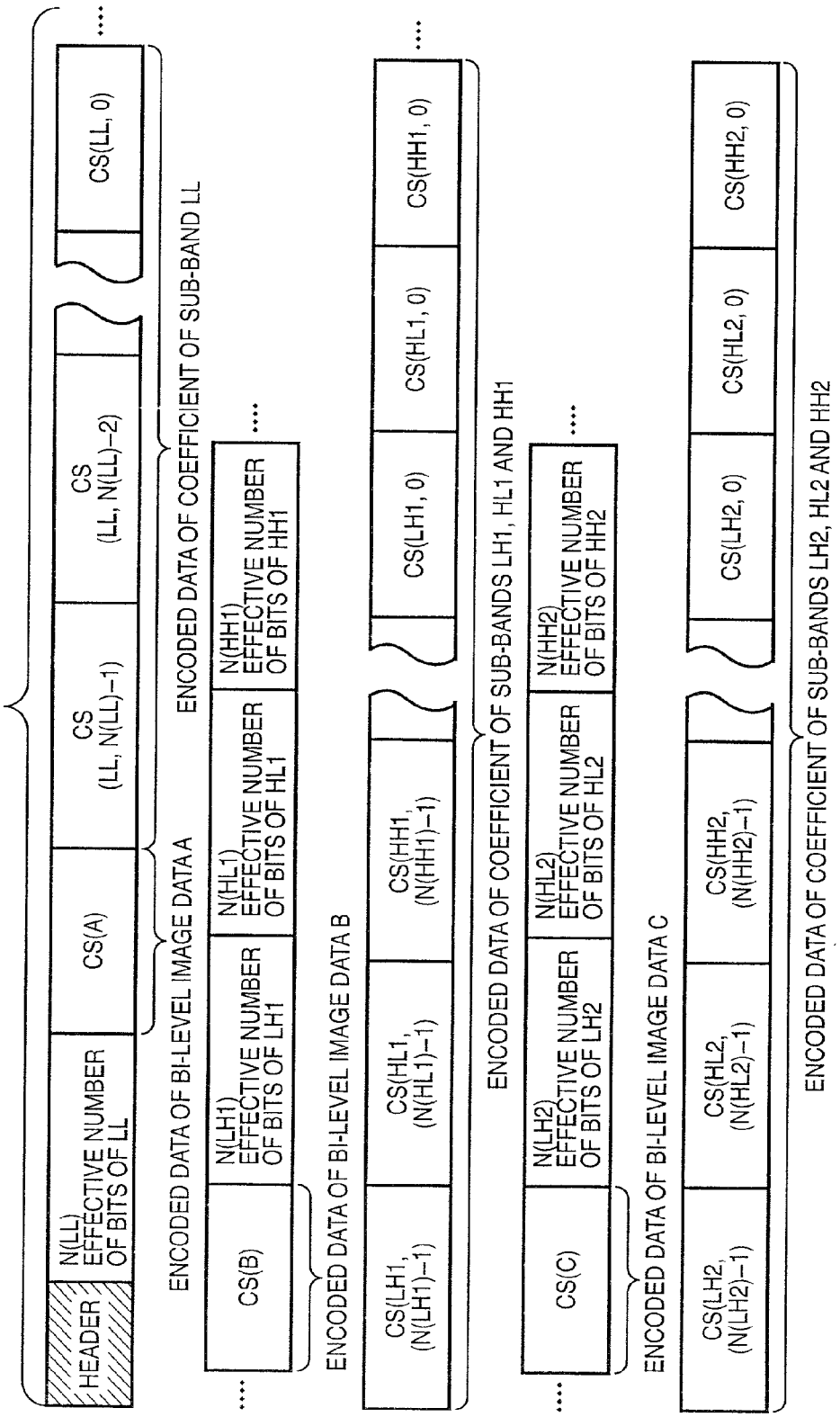
FIG. 17 is a view showing a code string in a third embodiment according to the present invention.

As shown in FIG. 11, in the first and second embodiments, the code string is constituted by placing the multi-level image encoded data first and the bi-level image encoded data subsequent thereto in each level. In this embodiment, the order is reversed: the bi-level image encoded data is placed first and the multi-level image encoded data is placed subsequent thereto as shown in FIG. 17.

Figure 18:
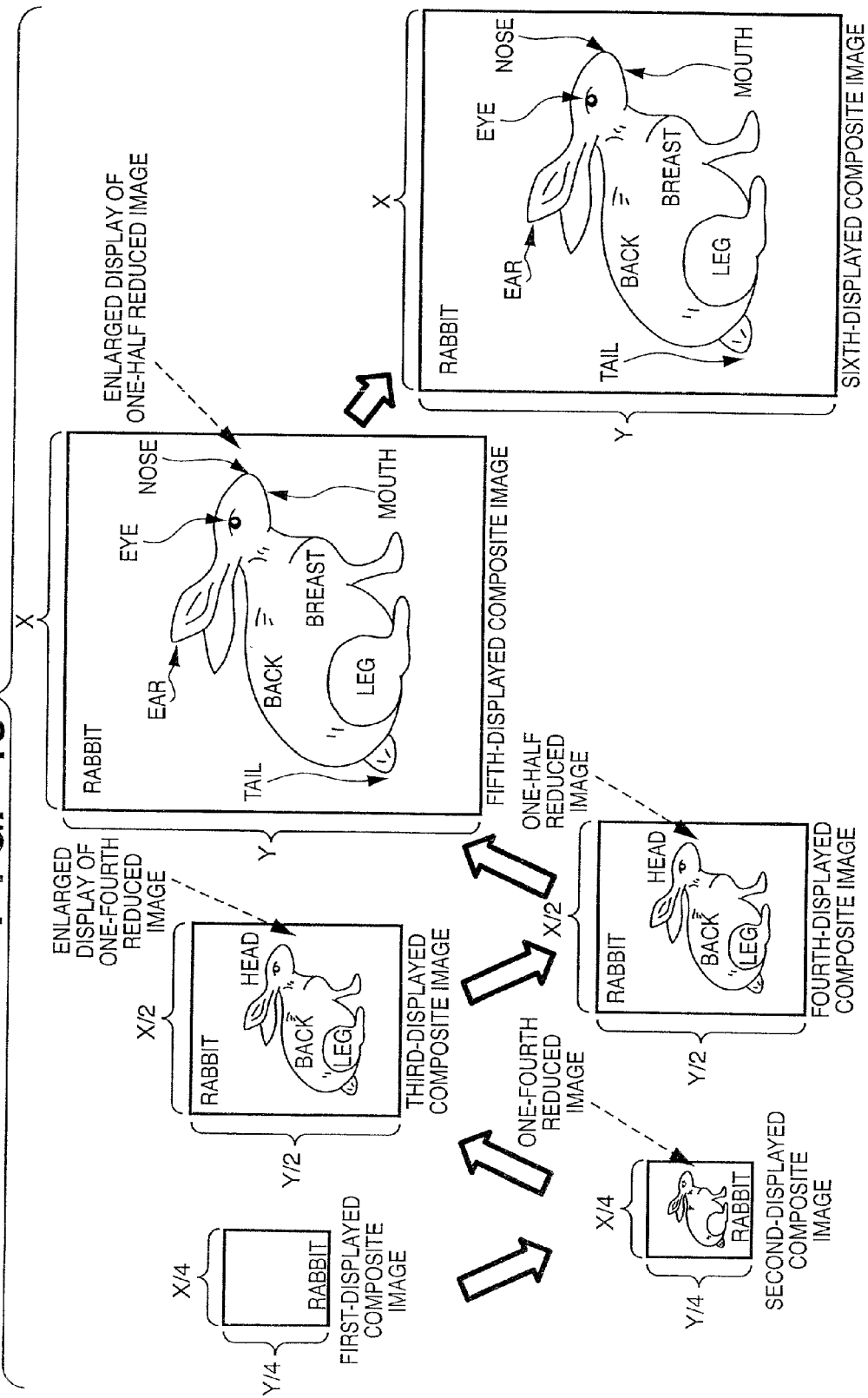
FIG. 18 is a view showing composite images displayed on an image display unit 107 in the third embodiment according to the present invention.

The system configuration in this embodiment is identical with that described in the second embodiment; therefore, further explanation will be omitted. However, only the procedures in the image composition unit 105 are slightly changed to generate a composite image by combining, at a point in time when the decoded bi-level image data is transmitted from the bi-level data decoding unit 105, an image generated by scaling to double a multi-level image currently displayed and the bi-level image, and the composite image is transmitted to the image display unit 107. According to the procedures, six-level image display becomes available as shown in FIG. 18.

[Fourth Embodiment]

Figure 20:
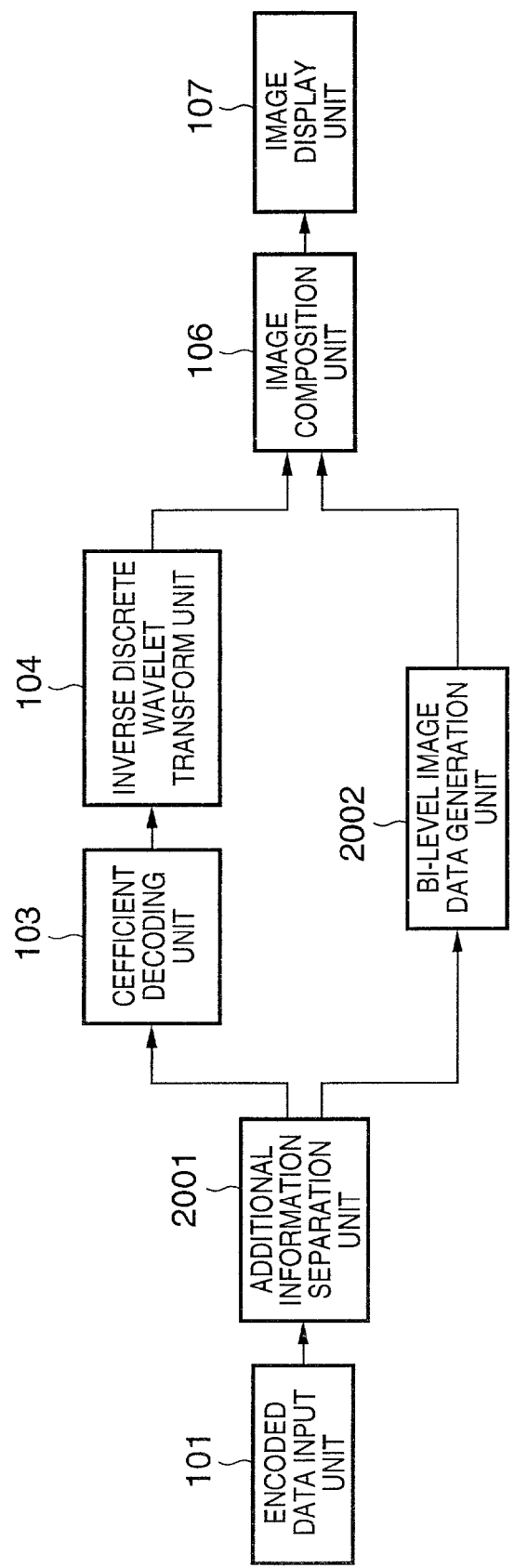
FIG. 20 is a block diagram showing a schematic configuration of an image decoding apparatus of a fourth embodiment according to the present invention.

FIG. 20 is a block diagram showing a schematic configuration of an image decoding apparatus in this embodiment. In the figure, the units same as those in FIG. 1 have the same reference numbers. In the figure, reference numeral 101 denotes an encoded data input unit, 2001 an additional information separation unit, 103 a coefficient decoding unit, 104 an inverse discrete wavelet transform unit, 2002 a bi-level image data generation unit, 106 an image composition unit and 107 an image display unit.

In this embodiment, just as in the first embodiment previously described, it is supposed that monochrome image data in which the luminance value of one pixel is represented by 8 bits is encoded and decoded. However, it is apparent from the following description that the embodiment is not limited to this example and it is applicable to the cases where luminance value is represented by other than 8 bits, for example, 4 bits, 10 bits or 12 bits as well as the cases of color image data in which each pixel is represented by multiple color components such as RGB, YCrCb and CMYK. It is also applicable to the case where the multi-level information indicating a condition of each pixel in an image region is encoded and decoded, for example, the case where the color of each pixel is represented by an index value for a color table, and the index value is encoded and decoded.

Prior to describing an operation of the image decoding apparatus of this embodiment, an image encoding apparatus, which makes a pair with the image decoding apparatus, will be explained.

Figure 21:
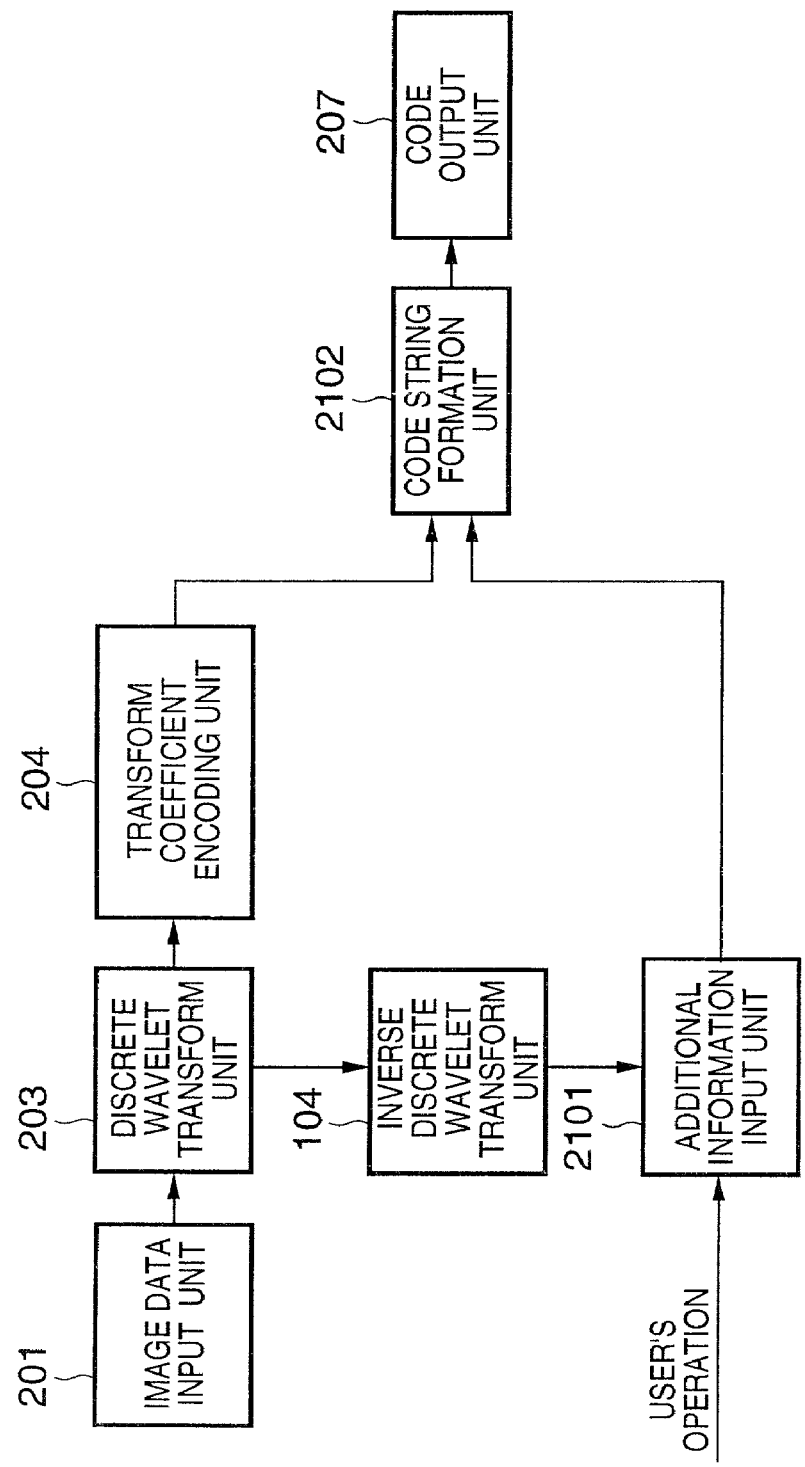
FIG. 21 is a block diagram showing a schematic configuration of an image encoding apparatus for generating encoded data to be input to the image decoding apparatus of the present invention having the configuration shown in FIG. 20.

FIG. 21 is a block diagram showing a schematic configuration of the image encoding apparatus for generating encoded data to be input to the image decoding apparatus of this embodiment having the configuration shown in FIG. 20. In FIG. 21, the units same as those in FIGS. 1 and 2 have the same reference numbers. In the figure, reference numeral 201 denotes an image data input unit, 203 a discrete wavelet transform unit, 204 a transform coefficient encoding unit, 2101 an additional information input unit, 2102 a code string formation unit, 207 a code output unit and 104 an inverse discrete wavelet transform unit.

The operation of the image encoding apparatus having the configuration shown in FIG. 21 will be explained as follows.

The image encoding apparatus encodes a piece of multi-level image data input through the image data input unit 201 by using a discrete wavelet transform, generates a code string by including additional information which is composed for each level of resolution in the wavelet transform, and outputs the code string by the code output unit 207.

First of all, pixel values constituting the multi-level image data are input through the image data input unit 201 in the order of raster scanning. The image data input unit 201 may be an image pickup apparatus such as a scanner or digital camera, an image pickup device such as a CCD, an interface of network lines, or the like.

The discrete wavelet transform unit 203 performs a two-dimensional discrete wavelet transform on the multi-level image data input through the image data input unit 201 to decompose the image data into multiple sub-bands. The transform coefficient encoding unit 204 encodes the coefficient of each sub-band obtained in the discrete wavelet transform unit 203 and generates a code string. Details on the processes of the discrete wavelet transform unit 203 and transform coefficient encoding unit 204 are the same as those of the first embodiment.

The inverse discrete wavelet transform unit 104 stores the coefficients of the sub-bands generated by the discrete wavelet transform unit 203 in a buffer in the order of sub-bands LL, LH1, HL1, HH1, LH2, HL2 and HH2, performs a two-dimensional inverse discrete wavelet transform on transform coefficients in the buffer, at the points in time when all the coefficients of sub-band LL are stored, when all the coefficients of sub-bands LL, LH1, HL1 and HH1 are stored, and when all the transform coefficients are stored, to generate a one-fourth reduced image, one-half reduced image and equal-size decoded image, and transmits them to the additional information input unit 2101. However, at the point in time when all the coefficients of the sub-band LL are stored, there exist the coefficients of low frequency sub-band; therefore, instead of performing the two-dimensional inverse discrete wavelet transform, the coefficients of the sub-band LL is transformed to 8-bit data and then output. The transform to 8-bit data is a process performed by replacing the coefficient of the sub-band LL, which is 0 or less, into 0 and replacing the coefficient of the sub-band LL, which is 255 or more, into 255. The inverse transform process in the inverse discrete wavelet transform unit 104 is the same as the process in the first embodiment.

Figure 22:
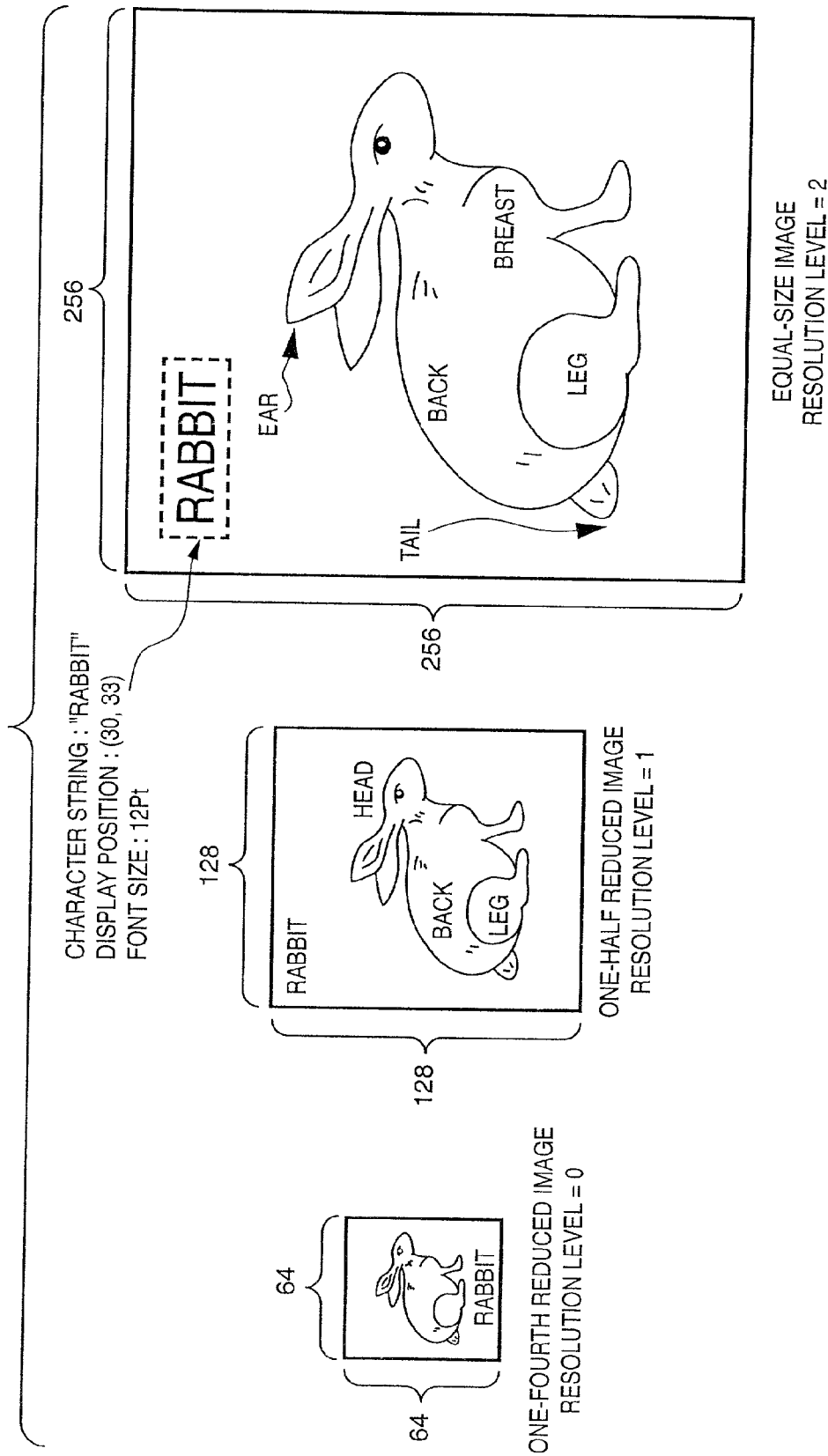
FIG. 22 is a view showing appearances of additional information provided by a user in the fourth embodiment according to the present invention.

The additional information input unit 2101 offers the one-fourth reduced image, one-half reduced image and equal-size decoded image transmitted from the inverse discrete wavelet transform unit 104 to the user, and receives an input of the additional information for the offered image of each resolution level. In this embodiment, the additional information to be input is supposed to be character information (character string information, a position for displaying the character string and a font size), and upon being received, the character information is stored in an inside buffer (not shown in the figure). The display position is represented by a position of the pixel at the top-left corner of a rectangular region in which the character information is displayed, provided that the top-left corner of the image data of each resolution level is represented as (0, 0). As the font size, the point value is used. FIG. 22 exemplifies a state in which image data of each resolution level is offered and the additional information is input, and FIG. 23 shows the example of additional information stored in the buffer. In FIG. 22, the characters "rabbit", "head", "back", "leg" and so forth written in the image of each resolution level are character strings included in the input additional information. Here, the size X, Y of the multi-level image input through the image data input unit 201 is supposed to be 256. For identifying the resolution level, 0, 1 and 2 are used in FIGS. 22 and 23: the resolution level of the one-fourth reduced image is 0; the resolution level of the one-half reduced image is 1; and resolution level of the image equal to the input image in size is 2.

When encoding by the transform coefficient encoding unit 204 is completed and all code strings are stored in the inside buffer, and the additional information for the image of each resolution level is input, the code string formation unit 2102 reads the code strings stored in the buffer in a predetermined order, obtains necessary additional information from the additional information input unit 2101 and inserts the information in the code strings to generate final code strings to be an output of the image encoding apparatus, and then outputs the code strings to the code output unit 207.

The final code strings generated in the code string formation unit 2102 have three-level hierarchy, namely, level 0, level 1 and level 2.

The level 0 is constituted by code strings CS (LL, N (LL)−1) to CS (LL, 0) obtained by encoding the coefficient of sub-band LL of the multi-level image data and additional information accompanying with the resolution level 0.

The level 1 is constituted by code strings CS (LH1, N (LH1)−1) to CS (LH1, 0), CS (HL1, N (HL1)−1) to CS (HL1, 0) and CS (HH1, N (HH1)−1) to CS (HH1, 0) obtained by encoding the coefficients of the sub-bands LH1, HL1 and HH1 of the multi-level image data, respectively, and additional information accompanying with the resolution level 1.

The level 2 is constituted by code strings CS (LH2, N (LH2)−1) to CS (LH2, 0), CS (HL2, N (HL2)−1) to CS (HL2, 0) and CS (HH2, N (HH2)−1) to CS (HH2, 0) obtained by encoding the coefficients of the sub-bands LH2, HL2 and HH2 of the multi-level image data, respectively, and additional information accompanying with the resolution level 2.

Figure 24:
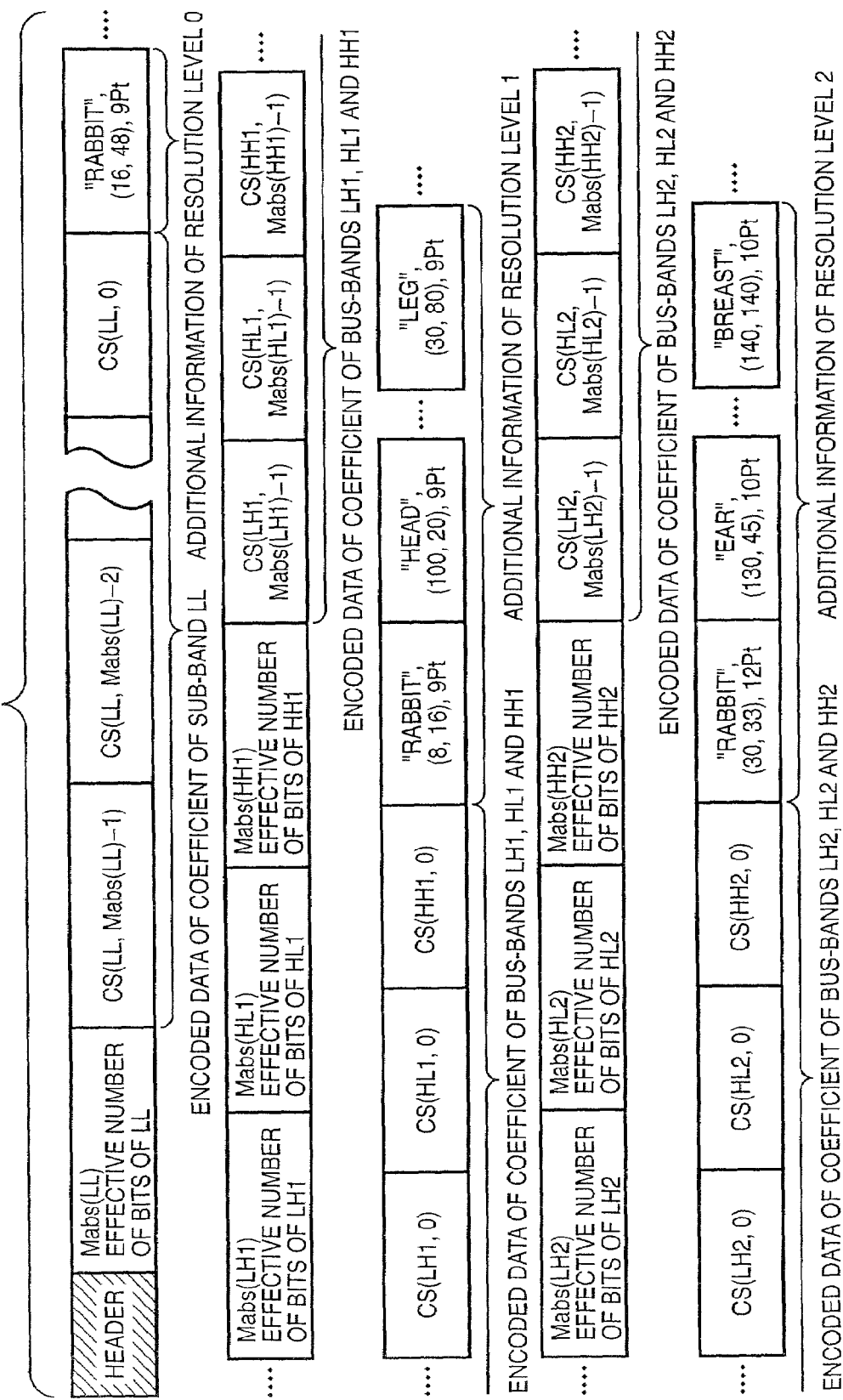
FIG. 24 is a view showing a format of a code string generated in the fourth embodiment according to the present invention.

The process in the code string formation unit 2102 is roughly the same as that of the code string formation unit 206 of the first embodiment shown in FIGS. 7 to 10 except that the outputs of CS (A) in step S806, CS (B) in S913 and CS (C) in S1013 are replaced with the outputs of the additional information of resolution level 0, additional information of resolution level 1 and additional information of resolution level 2, respectively. As in the case of the first embodiment, the program code according to the flowchart is supposed to be stored in a memory (not shown) such as ROM or RAM of the image encoding apparatus in this embodiment, and read and executed by a CPU (also not shown). In FIG. 24, data structures of the code strings generated by the code string formation unit 2102 are shown.

The code output unit 207 outputs the code strings generated by the code string formation unit 2102 to the external of the device. The code output unit 207 is, for example, a storage device such as a hard disk or memory, an interface of network lines, or the like.

Next the image decoding apparatus of this embodiment, which receives an input of the code strings having the formats shown in FIG. 24 generated by the image encoding apparatus according to the above processes, decodes and displays an image will be described.

First of all, the code strings having the formats shown in FIG. 24 are input through the encoded data input unit 101. The encoded data input unit 101 is, for example, a storage device such as a hard disk or memory, an interface of network lines, or the like.

The additional information separation unit 2001 transmits the code strings input through the encoded data input unit 101 to the coefficient decoding unit 103 or bi-level image data generation unit 2002 in accordance with their contents (by referring to the header). More specifically, the effective number of bits of each sub-band and encoded data of the coefficient of the sub-band are transmitted to the coefficient decoding unit 103, and additional information of each of resolution revels 0, 1, and 2 is transmitted to the bi-level image data generation unit 2002. The header information including the number of pixels in the horizontal direction and vertical direction is interpreted in the additional information separation unit 2001 and referred to in the entire image decoding apparatus.

The coefficient decoding unit 103 decodes the encoded data of the coefficient of the sub-band transmitted from the additional information separation unit 2001 back into the transform coefficient. The inverse discrete wavelet transform unit 104 performs the two-dimensional inverse discrete wavelet transform on the transform coefficient decoded in the coefficient decoding unit 103 to generate a one-fourth reduced image, one-half reduced image and equal-size decoded image and transmits them to the image composition unit 106. The specific processes of the coefficient decoding unit 103 and inverse discrete wavelet transform unit 104 have been described in the first embodiment; therefore no further description will be made.

Based on the additional information of each resolution level transmitted from the additional information separation unit 2001, the bi-level image data generation unit 2002 rasterizes the character information to generate bi-level image data. Specifically, for the resolution level 0, bi-level image data A (x, y) whose numbers of pixels in the horizontal and vertical directions are X/4 and Y/4, respectively, is generated and a character string specified in the additional information accompanying the resolution level 0 is arranged in a specified display position with a specified font size. A pixel value A (x, y) of bi-level image data A, whose pixel position in the horizontal direction is x and that in the vertical direction is y, is supposed to be 1 if it is a pixel on the font, and supposed to be 0 if it is a pixel not on the font. Similarly, for the resolution level 1, bi-level image data B (x, y) whose numbers of pixels in the horizontal and vertical directions are X/2 and Y/2, respectively, is generated and the pixel value is determined from the additional information accompanying the resolution level 1 and, for the resolution level 2, bi-level image data C (x, y) whose numbers of pixels in the horizontal and vertical directions are X and Y, respectively, is generated and the pixel value is determined from the additional information accompanying the resolution level 2.

The image composition unit 106 generates a composite image by superimposing the one-fourth reduced image output by the inverse discrete wavelet transform unit 104 and the bi-level image data A output by the bi-level image data generation unit 2002, and outputs the composite image to the image display unit 107. Similarly, the one-half reduced image and bi-level image data B, and the equal-sized decoded image and bi-level image data C are superimposed and output. The process in the image composition unit 106 is the same as the first embodiment.

The image display unit 107 displays the composite image generated by the image composition unit 106.

The process flow of the image decoding apparatus of this embodiment is roughly the same as that of the image decoding apparatus of the first embodiment except only that steps S1203, S1207 and S1211 in FIG. 12 which is the flowchart showing the process of the image decoding apparatus of the first embodiment are replaced with generation of the bi-level image data A, bi-level image data B and bi-level image data C, respectively. The program code according to the flowchart is supposed to be stored in a memory (not shown) such as ROM or RAM, and read and executed by a CPU (also not shown).

From the figure, it is understood that, for an input of a single code string, three composite images different in resolution level are displayed by steps S1205, S1209 and S1213. In this embodiment, images are encoded and displayed for all resolution levels 0, 1 and 2 in order. However, it is possible to skip the display of an image of a predetermined resolution level, or to suspend decoding and/or display of an image of a resolution level at some midpoint, in reply to the user's request.

[Fifth Embodiment]

Figure 25:
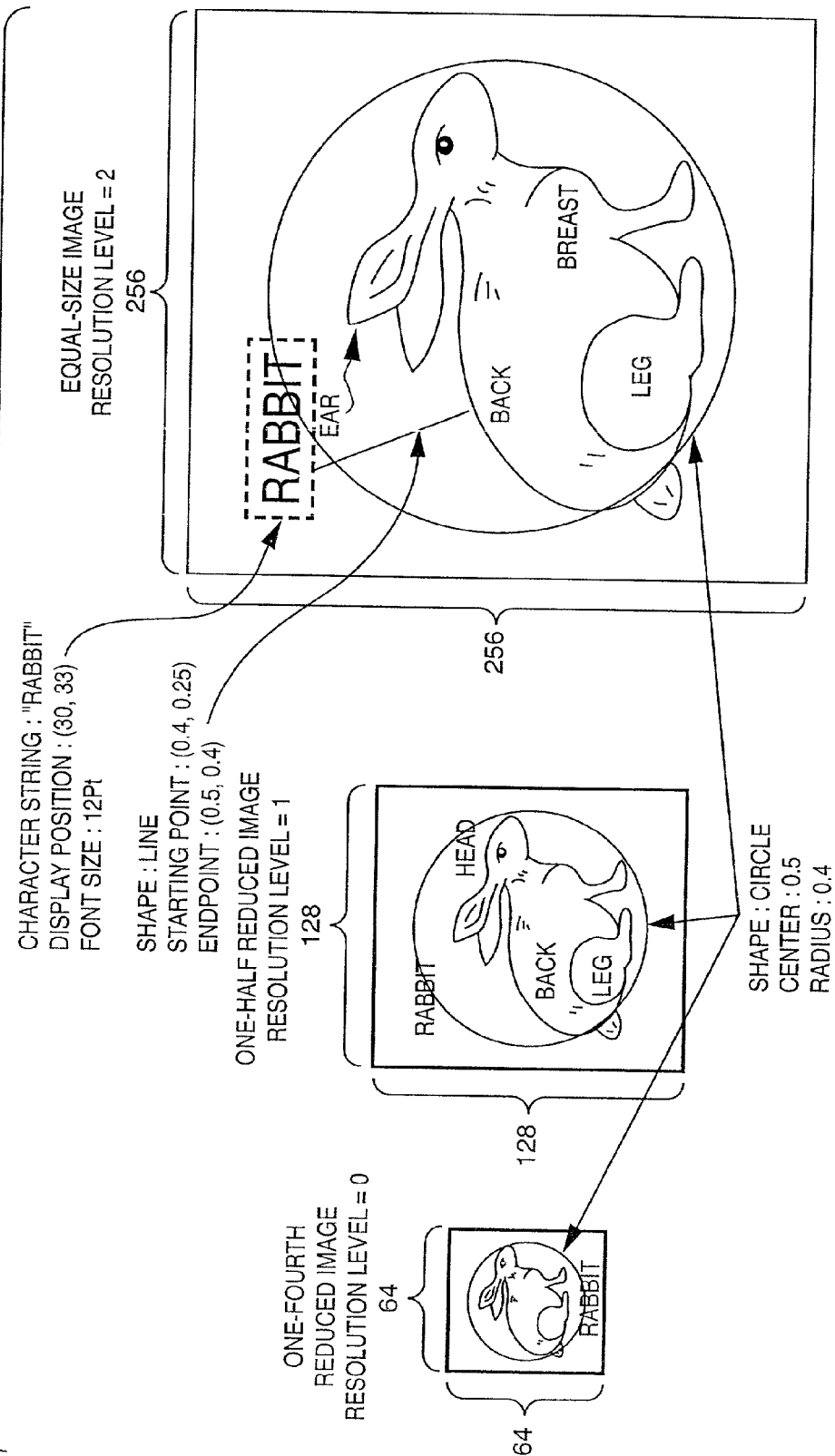
FIG. 25 is a view showing appearances of additional information provided by a user in a fifth embodiment according to the present invention.
Figure 26:
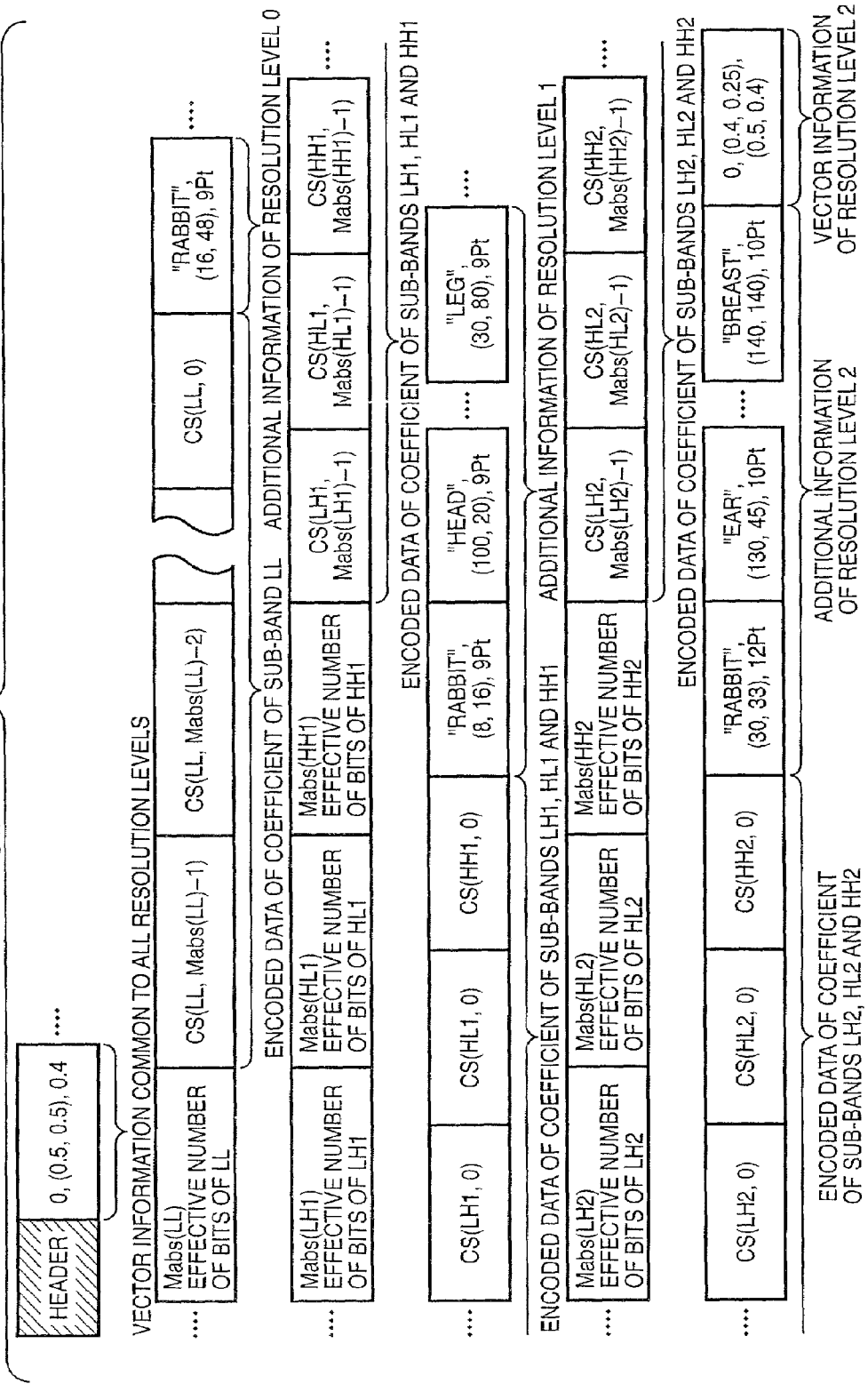
FIG. 26 is a view showing a format of a code string generated in the fifth embodiment according to the present invention.

In the fourth embodiment, the additional information accompanying the image of each resolution level is supposed to be character information, but it may be vector information such as lines or graphics. In this embodiment, the additional information input unit 2101 in the fourth embodiment is modified so that information about lines and circles can be input. FIG. 25 shows an example of the additional information input by user. The vector information includes, in the case of lines, shape information, starting point coordinates and endpoint coordinates, and, in the case of circles, shape information, center coordinates and radius. Here, the coordinate values are represented, provided that the number of pixels of an image of each resolution level in the horizontal and vertical directions is supposed to be 1.0. In the example of FIG. 25, a circle of the radius 0.4 is superimposed on all the images of resolution levels of 0, 1 and 2 at the center thereof (coordinates (0.5, 0.5)), and a line having a starting point (0.4, 0.25) and endpoint (0.5, 0.4) is superimposed on the image of resolution level 2. An example of a code string in this embodiment for such additional information is shown in FIG. 26. As is apparent from the figure, the vector information common to all resolution levels is output prior to the output of data constituting the resolution level 0.

The system configuration in this embodiment is the same as that described in the fourth embodiment; and therefore, the explanation will be omitted. However, as described above, the procedures in the additional information input unit 2101 are slightly changed to extend its function so that the vector information can be input, and moreover, the bi-level image data generation unit 2002 is modified to superimpose lines and/or circles on bi-level image data of a predetermined resolution level based on the vector information included in the code string. According to the changes, it becomes possible to include not only the character strings but also the information about lines, circles and the like in the additional information.

The present invention is not limited to the above-described embodiments. For example, in the above-described embodiments, the encoding process using the discrete wavelet transform has been described. However, the discrete wavelet transform is not limited to that used in the above embodiments, and the type of filter or application method may be changed. For instance, the filter can be changed to that having the larger number of taps, such as a 9/7 filter. Other than the discrete wavelet transform, any method suitable to encode image data hierarchically may be put to use, and moreover, an encoding method based on other serial transform methods, such as DCT, Hadamard transform, or the like may be employed. Also, the coefficient encoding method is not limited to those described in the above embodiments: arithmetic encoding methods other than the QM-Coder, such as MQ-Coder, or other entropy encoding method may be used. Furthermore, in the above embodiments, the methods in which bi-level image data is generated from additional information and combined with multi-level image data in the decoding process. However, the image data restored from the additional information is not limited to the bi-level image data: limited gray-scale image data or color image data may be used.

[Other Embodiments]

The present invention can be applied to a system constituted by multiple instruments (for example, a host computer, interface equipment, reader, printer, or the like) or a system constituted by a single instrument (for example, a copying machine, facsimile, or the like).

The purpose of the present invention can be achieved by providing a storage medium (or recording medium) storing program code of the software application that realizes functions in the above-described embodiments to a system or apparatus so that a computer (or CPU or MPU) of the system or apparatus may read and execute the program code stored in the storage medium. In this case, the program code read from the storage medium realizes by itself the function in the above-described embodiments, and the storage medium that stores the program code constitutes the present invention. Not only the execution of the program code having been read by the computer realizes the function of the above-described embodiments, but also the operation system (OS) working on the computer performs all or part of the actual process based on the instructions of the program code, and according to the process, the function of the above-described embodiments can be realized.

Moreover, the program code read from the storage medium is written to a function extension card inserted in the computer or a memory provided to a function extension unit connected to the computer, and based on the instructions of the program code, a CPU or the like disposed in the function extension card or function extension unit performs all or part of the actual process, and according to the process, the function of the above-described embodiments can be realized.

If the present invention is applied to the storage medium described above, the program code corresponding to the flowcharts described in the above embodiments is stored in the medium.

As explained so far, according to the present invention, though encoded data is generated by encoding the image data in which multi-level image data and bi-level image data are mixed, it is possible to read the bi-level image data even from a decoded image of low resolution when decoding the encoded data.

The present invention is not limited to the above embodiments and various changes and modifications can be made within the spirit and scope of the present invention. Therefore, to apprise the public of the scope of the present invention, the following claims are made.

What is claimed is:

1. An image processing apparatus that decodes encoded data including hierarchy encoded image data capable of representing a plurality of self-similar images of different resolutions and a plurality of encoded additional information representing additional images of different resolution comprising:

first decoding means for decoding image data having a resolution from the hierarchy encoded image data included in the encoded data;

second decoding means for decoding additional image data corresponding to the resolution of the image data decoded by said first decoding means; and composition means for combining the image data obtained by said first decoding means and the additional image data corresponding to the resolution of the decoded image data.

2. The image processing apparatus according to claim 1, further comprising:

tile connecting means for restoring the original additional image data and image data from tiles of a predetermined size, the tiles having been made by dividing the additional image data and the image data, by connecting the tiles constituting each of the additional image data and the image data.

3. The image processing apparatus according to claim 1, further comprising:

scaling means for scaling image data decoded by said first decoding means to approximately the same resolution as image data next decoded by said first decoding means, wherein said composition means combines the image data scaled by said scaling means and additional image data of a resolution corresponding to the scaled image data, the additional image data having been decoded by said second decoding means.

4. The image processing apparatus according to claim 1, wherein the additional information is an additional image prepared in accordance with the image resolution of a reconstructed image from the encoded image data when decoding said encoded image data.

5. The image processing apparatus according to claim 1, wherein the additional information is character information prepared in accordance with the encoded image resolution of a reconstructed image from the encoded image data when decoding the encoded image data, the character information including character string information, a display position for displaying the character string on predetermined display means and a font size of the character string, and said composition means rasterizes the character information to generate bi-level image data and combines the hi-level image data and image data obtained by said first decoding means.

6. The image processing apparatus according to claim 1, wherein the additional information is character information and line and/or graphics information prepared in accordance with the image resolution of a reconstructed image from the encoded image when decoding the encoded image data, the character information including character string information, a display position for displaying the character string on predetermined display means and a font size of the character string, and the line and/or graphics information including any of shape information, starting point coordinates, endpoint coordinates, center coordinates and radius, and said composition means rasterizes the character information to generate hi-level image data, arranges a line and/or graphics using the line and/or graphics information on the hi-level image data and combines therewith image data obtained by said first decoding means.

7. An image processing apparatus, comprising:

first encoding means for encoding image data to generate hierarchy encoded image data capable of representing a plurality of self-similar images of different resolutions corresponding to the image data;

second encoding means for encoding additional information representing additional images to be superimposed to each of the plurality of self-similar images, to generate a plurality of encoded additional information; and encoded data construction means for constructing encoded data including the hierarchy encoded image data generated by said first encoding means and the plurality of encoded additional information generated by said second encoding means, and causing the encoded data to include a header therein, the header describing information that specifies locations of the hierarchy encoded image data and the encoded additional information in the encoded data.

8. The image processing apparatus according to claim 7, further comprising:

tile dividing means for dividing the additional image data and the image data into tiles having a predetermined size.

9. The image processing apparatus according to claim 7, wherein said first encoding means performs a wavelet transform and the encoded data of a self-similar image is encoded data of each sub-band generated by the wavelet transform.

10. The image processing apparatus according to claim 7, wherein said second encoding means uses arithmetic encoding.

11. The image processing apparatus according to claim 7, wherein the additional information is an additional image prepared in accordance with the image resolution of a reconstructed image from the encoded image data when decoding the encoded image data.

12. The image processing apparatus according to claim 7, wherein the additional information data is character information prepared in accordance with the encoded image resolution of a reconstructed image from the encoded image data when reproducing the encoded image data, the character information including character string information, a display position when displaying the character string on a predetermined display means, and a font size of the character string.

13. The image processing apparatus according to claim 7, wherein the additional information is character information and line and/or graphics information prepared in accordance with the image resolution of a reconstructed image from the encoded image data when decoding the encoded image data, the character information including character string information, a display position when displaying the character string on a predetermined display means, and a font size of the character string, the line and/or graphics information including any of shape information, starting point coordinate, endpoint coordinate, center coordinate, radius.

14. An image processing method for decoding encoded data including hierarchy encoded image data capable of representing a plurality of self-similar images of different resolutions and a plurality of encoded additional information representing additional images of different resolution comprising:

a first decoding step, of decoding image data having a resolution from the hierarchy encoded image data included in the encoded data;

a second decoding step, of decoding additional image data corresponding to the resolution of the image data decoded in said first decoding step; and a composition step, of combining the image data obtained in said first decoding step and the additional image data corresponding to the resolution of the decoded image data.

15. The image processing method according to claim 14, further comprising:
a tile connecting step, of restoring the original additional image data and image data from tiles of a predetermined size, the tiles having been made by dividing the additional image data and the image data, by connecting the tiles constituting each of the additional image data and the image data.

16. The image processing method according to claim 14, further comprising:
a scaling step, of scaling image data decoded in said first decoding step to approximately the same resolution as image data next decoded in said first decoding step, wherein
said composition step includes combining the image data scaled in said scaling step and additional image data of a resolution corresponding to the scaled image data, the additional image data having been decoded in said second decoding step.

17. An image processing method, comprising:
a first encoding step, of encoding image data to generate hierarchy encoded image data capable of representing a plurality of self-similar images of different resolutions corresponding to the image data;
a second encoding step, of encoding additional information representing additional images to be superimposed to each of the plurality of self-similar images, to generate a plurality of encoded additional information; and
an encoded data construction step, of constructing encoded data including the hierarchy encoded image data generated in said first encoding step and the plurality of encoded additional information generated in said second encoding step, and causing the encoded data to include a header therein, the header describing information that specifies locations of the hierarchy encoded image data and the encoded additional information in the encoded data.

18. The image processing method according to claim 17, further comprising:
a tile dividing step, of dividing the additional image data and the image data into tiles having a predetermined size.

19. A computer-readable storage medium that stores a program for executing the image processing method according to claim 14.

20. A computer-readable storage medium that stores a program for executing the image processing method according to claim 17.

21. An image processing apparatus that decodes encoded data including encoded image data and a plurality of encoded additional information obtained by encoding additional information, the encoded image data being capable of representing a multi-resolution image, the plurality of additional information being prepared in accordance with each resolution represented by the encoded image data, comprising;
image data reproducing means capable of reproducing a multi-resolution image from the encoded image data included in the encoded data;
additional information data decoding means for decoding additional information corresponding to the resolution of the image data reproduced by said image data reproducing means from the encoded additional information included in the encoded data; and
composition means for combining the image data obtained by said image data reproducing means and the additional information data decoded by additional information data decoding means.

22. An image processing method for decoding an encoded data including encoded image data and a plurality of encoded additional information obtained by encoding additional information, the encoded image data being capable of representing a multi-resolution image, the plurality of additional information being prepared in accordance with each resolution represented by the encoded image data, comprising;
an image data reproducing step, of reproducing a multi-resolution image from the encoded image data included in the encoded data;
an additional information data decoding step, of decoding additional information corresponding to the resolution of the image data reproduced in said image data reproducing step from the encoded additional information included in the encoded data; and
a composition step, of combining the image data obtained in said image data reproducing step and the additional information data decoded in said additional information data decoding step.

23. A computer-readable storage medium that stores a program for executing the image processing method according to claim 22.

* * * * *

UNITED STATES PATENT AND TRADEMARK OFFICE
CERTIFICATE OF CORRECTION

| | |
|---|---|
| PATENT NO. | : 6,985,630 B2 |
| APPLICATION NO. | : 09/962109 |
| DATED | : January 10, 2006 |
| INVENTOR(S) | : Hiroshi Kajiwara |

It is certified that error appears in the above-identified patent and that said Letters Patent is hereby corrected as shown below:

SHEET 12

FIG. 12, "DATTA B" should read --DATA B--.

SHEET 20

FIG. 20, "CEFFICIENT" should read --COEFFICIENT--.

SHEET 24

FIG. 24, "BUS-BANDS" should read --SUB-BANDS-- (4 times).

ON COVER PAGE (56) FOREIGN PATENT DOCUMENTS

"11103445 A" should read --11-103445 A--.

COLUMN 1

Line 42, "An" should read --a--.

COLUMN 7

Line 46, "soon" should read --so on--; and
    Line 67, "805)" should read --S805)--.

COLUMN 8

Line 14, "911)" should read --S911)--; and
    Line 33, "1011)" should read --S1011)--.

COLUMN 12

Line 13, "to" should read --to us--.

COLUMN 16

Line 5, "revels" should read --levels--.

UNITED STATES PATENT AND TRADEMARK OFFICE
CERTIFICATE OF CORRECTION

PATENT NO. : 6,985,630 B2
APPLICATION NO. : 09/962109
DATED : January 10, 2006
INVENTOR(S) : Hiroshi Kajiwara It is certified that error appears in the above-identified patent and that said Letters Patent is hereby corrected as shown below:

COLUMN 19

Line 44, "hi-level" should read --bi-level--;
Line 61, "hi-level" should read --bi-level--; and
Line 63, "hi-level" should read --bi-level--.

COLUMN 20

Line 54, "coordinate, radius." should read --coordinate and radius.--.

COLUMN 22

Line 11, "ing;" should read --ing:--;
Line 25, "an" should be deleted;
Line 32, "ing;" should read --ing:--; and
Line 34, "data" should be deleted.

Signed and Sealed this

Eighth Day of August, 2006

JON W. DUDAS
*Director of the United States Patent and Trademark Office*